United States Patent

Griggs et al.

[15] 3,635,780
[45] Jan. 18, 1972

[54] BONDING MACHINE FOR FABRICS WITH LOCATING AND AUXILIARY BONDING MEANS

[72] Inventors: Richard V. Griggs, Palatine; John G. Attwood, Oak Park, both of Ill.

[73] Assignee: Union Special Machine Company, Chicago, Ill.

[22] Filed: Feb. 12, 1968

[21] Appl. No.: 704,840

[52] U.S. Cl. ............................................. 156/583, 100/93 P
[51] Int. Cl. ................................. B30b 15/34, B32b 31/20
[58] Field of Search .................. 156/583, 516, 510, 285, 581, 156/242; 100/93 P, 226

[56] References Cited

UNITED STATES PATENTS

| | | | |
|---|---|---|---|
| 3,045,585 | 7/1962 | Faeber .................. | 100/93 P |
| 3,172,298 | 3/1965 | Rosenbaum .................. | 156/583 X |
| 3,250,660 | 5/1966 | Greig et al. .................. | 156/581 |
| 3,296,055 | 1/1967 | Wilkins .................. | 156/581 X |
| 3,399,097 | 8/1968 | Vissage .................. | 156/583 |
| 3,204,506 | 9/1965 | Reinhold .................. | 100/226 X |

*Primary Examiner*—Benjamin A. Borchelt
*Assistant Examiner*—J. J. Devitt
*Attorney*—Diller, Brown, Ramik & Halt

[57] ABSTRACT

This invention relates to an apparatus for bonding textile fabrics or similar sheet material by utilizing heat-activatable adhesives of the thermoplastic or thermosetting type, the apparatus being of the type including a pair of relatively movable presser bars between which adhesively coated lapped portions of the sheets are subjected to heat and pressure during a bonding operation. A retractible locating mechanism is provided adjacent the lowermost, stationary presser bar for accurately positioning an edge portion of a first sheet relative to a second sheet carried by the upper, movable presser bar. Releasable clamping means secure the second sheet to the movable presser bar, and the clamping means are preferably of an adjustable nature for securing different mixed ones of the second sheets to the movable presser bar. The movable presser bar also carries means for heat-pressure securing a third sheet, such as a label, to the second sheet which may, for example, be the waistband of a garment, prior to bonding the waistband to the sheet supported by the stationary presser bar, the latter sheet being, for example, the "developed" length of a pair of trousers, shorts or similar garments.

Piston-cylinder mechanisms are provided for exerting the necessary pressure during a bonding operation, and means are provided for preventing the operative positioning of the piston-cylinder mechanisms relative to the movable presser bar and the actuation thereof when an operator's hand or other obstructions are positioned between the presser bars.

In a preferred form of the invention each of the various means and mechanisms heretofore described is controlled by and under the influence of a fluid circuit system.

16 Claims, 17 Drawing Figures

INVENTORS
RICHARD V. GRIGGS
& JOHN G. ATTWOOD
BY
Mason, Porter, Diller & Brown
ATTORNEYS

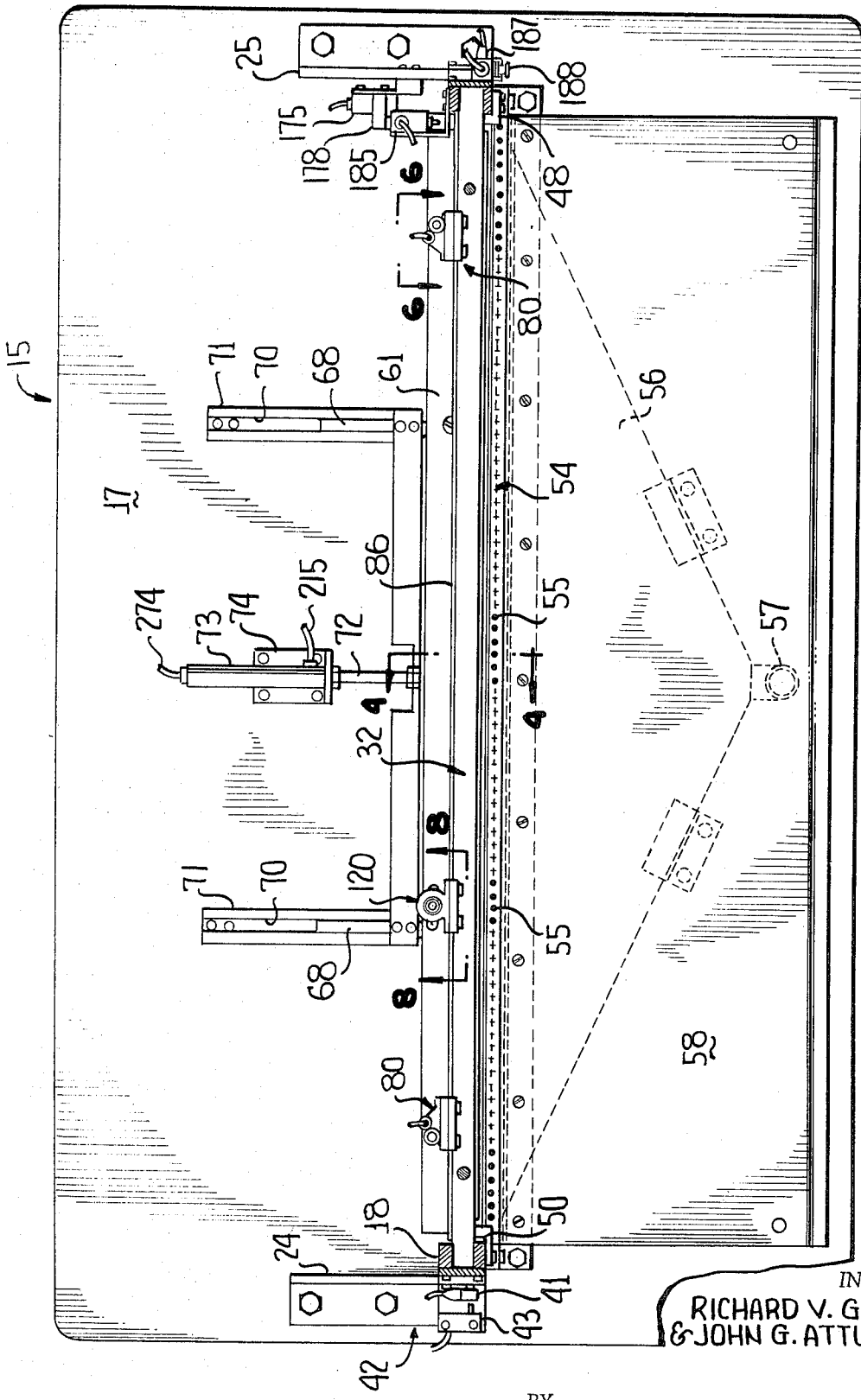

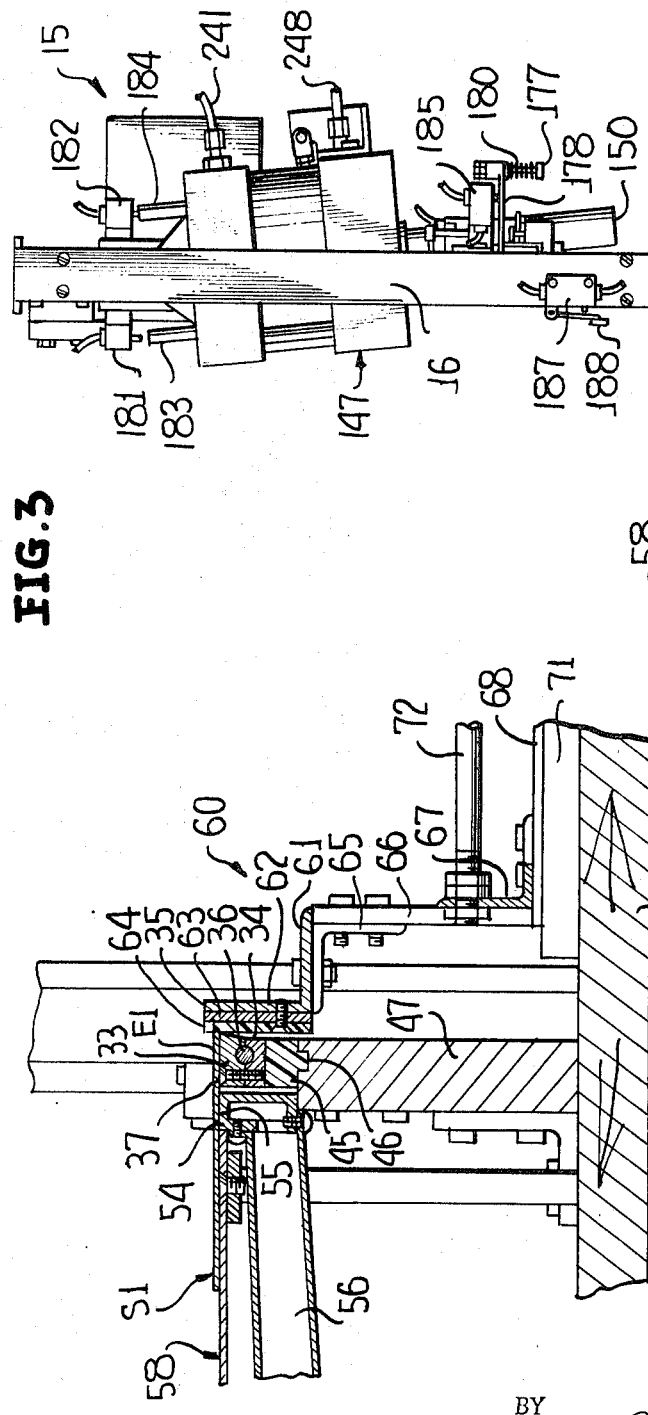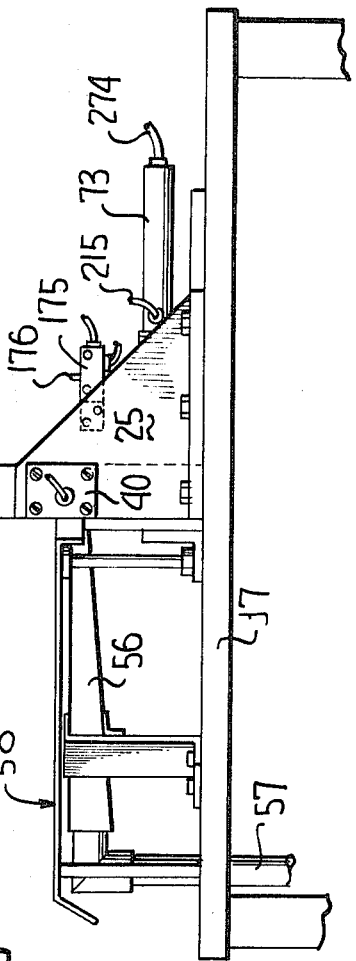

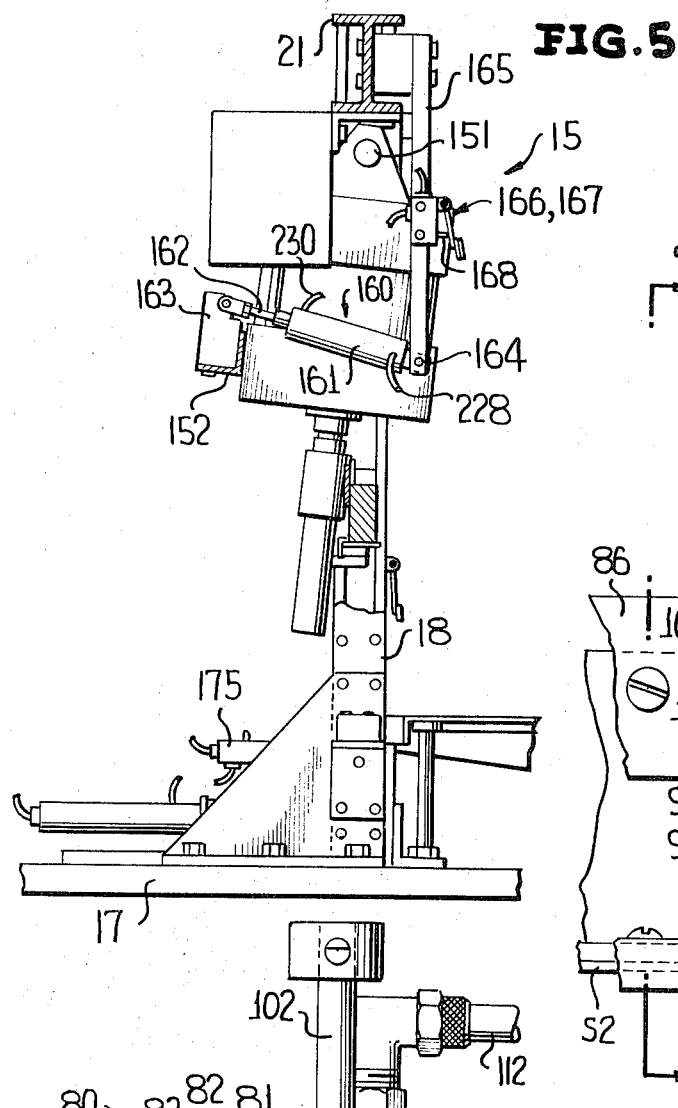
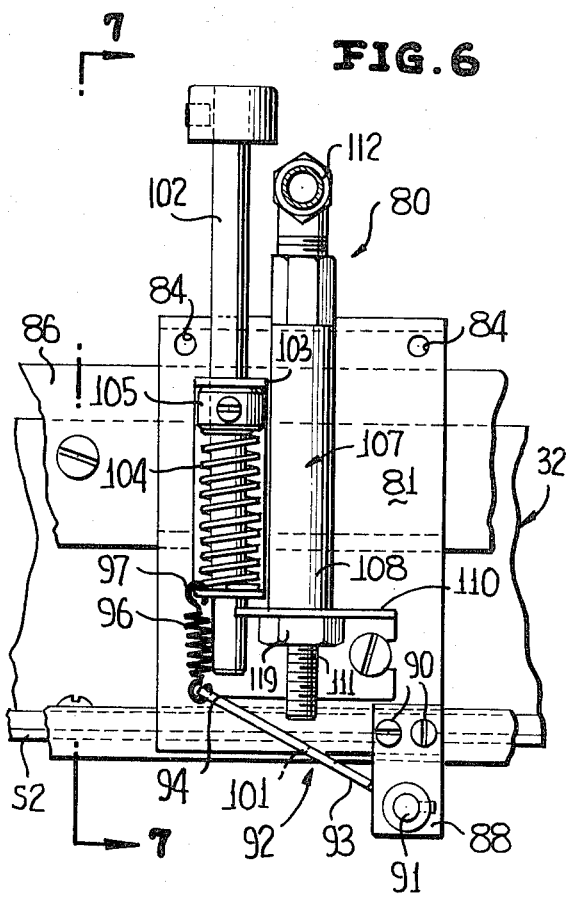
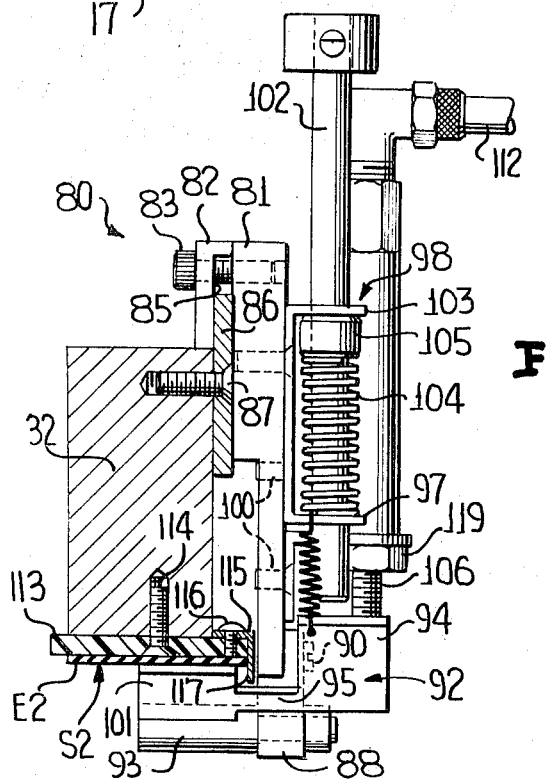
FIG. 5
FIG. 6
FIG. 7
INVENTORS
RICHARD V. GRIGGS
& JOHN G. ATTWOOD

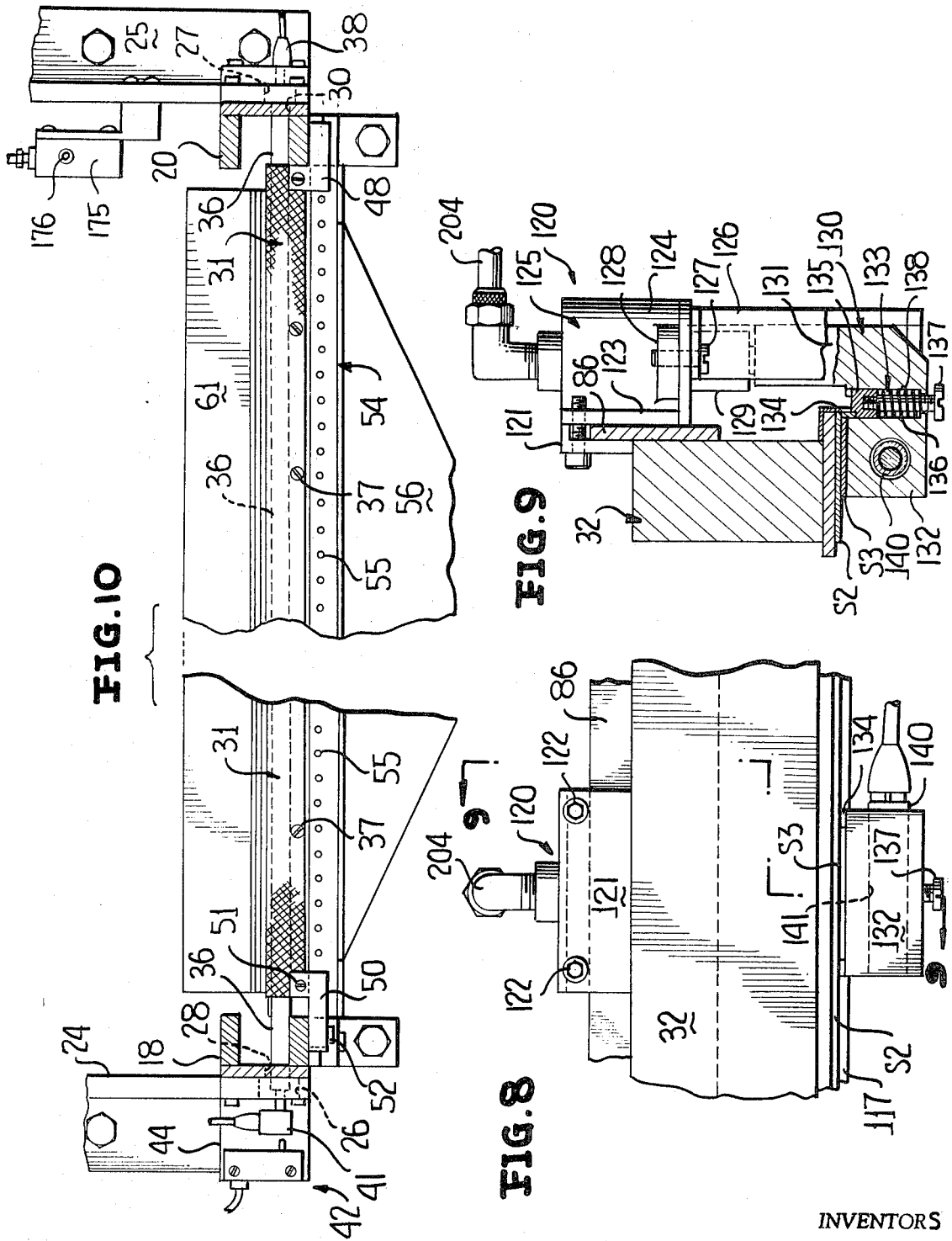

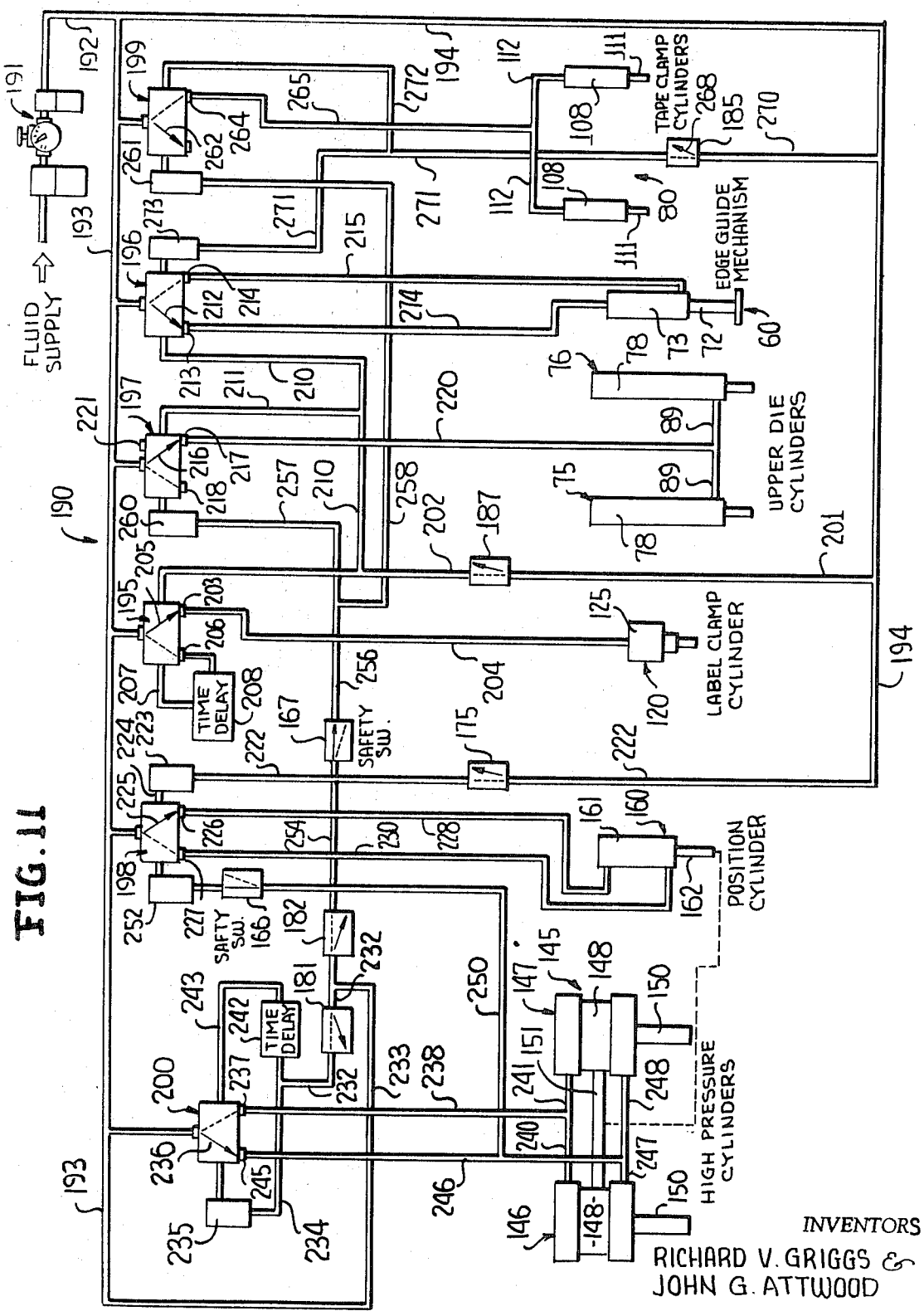

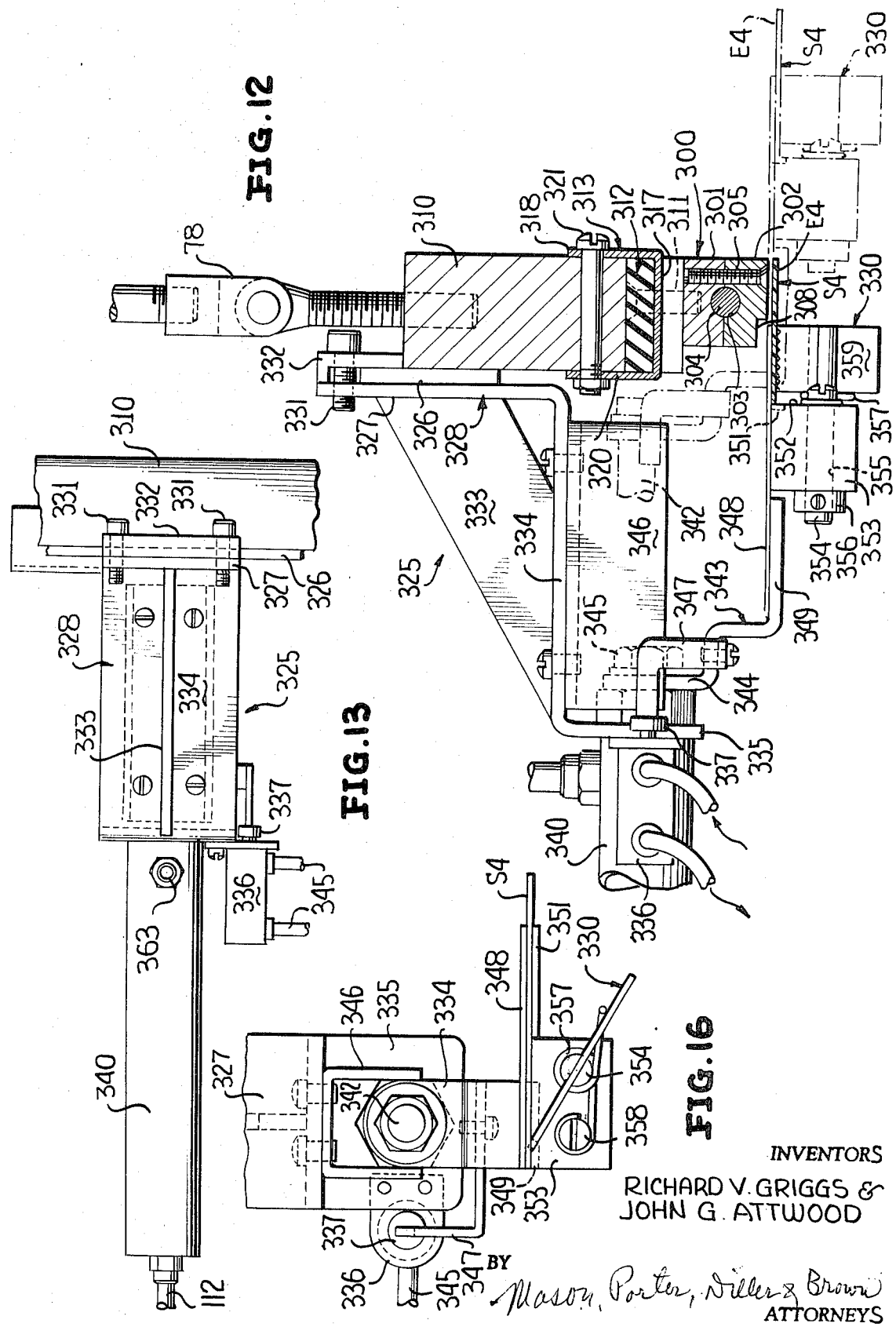

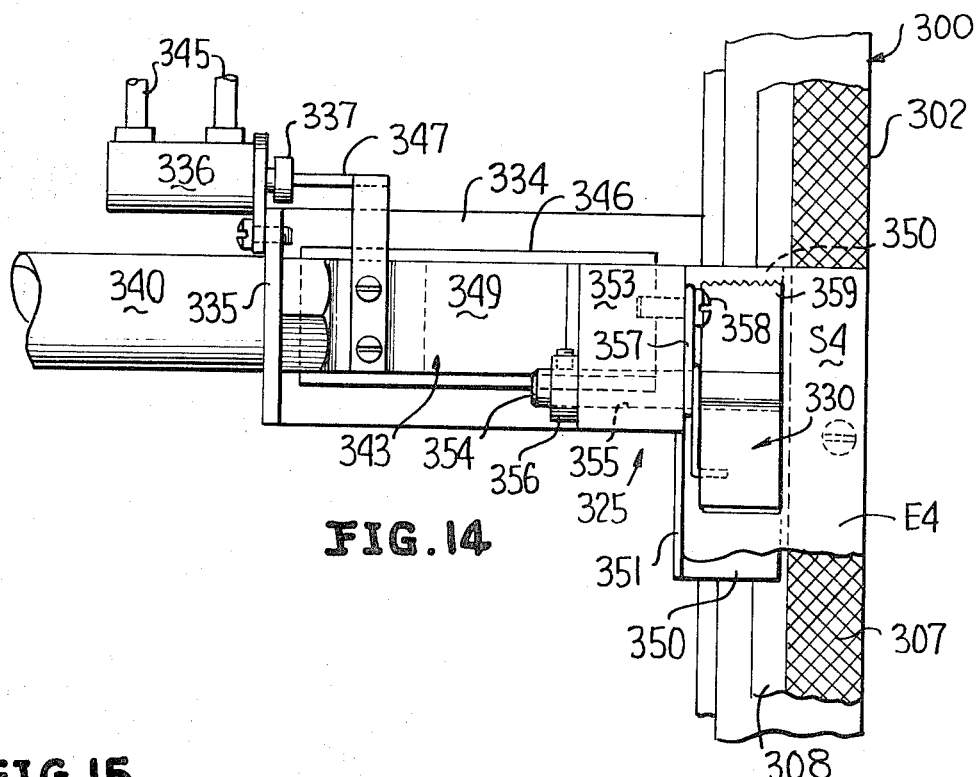
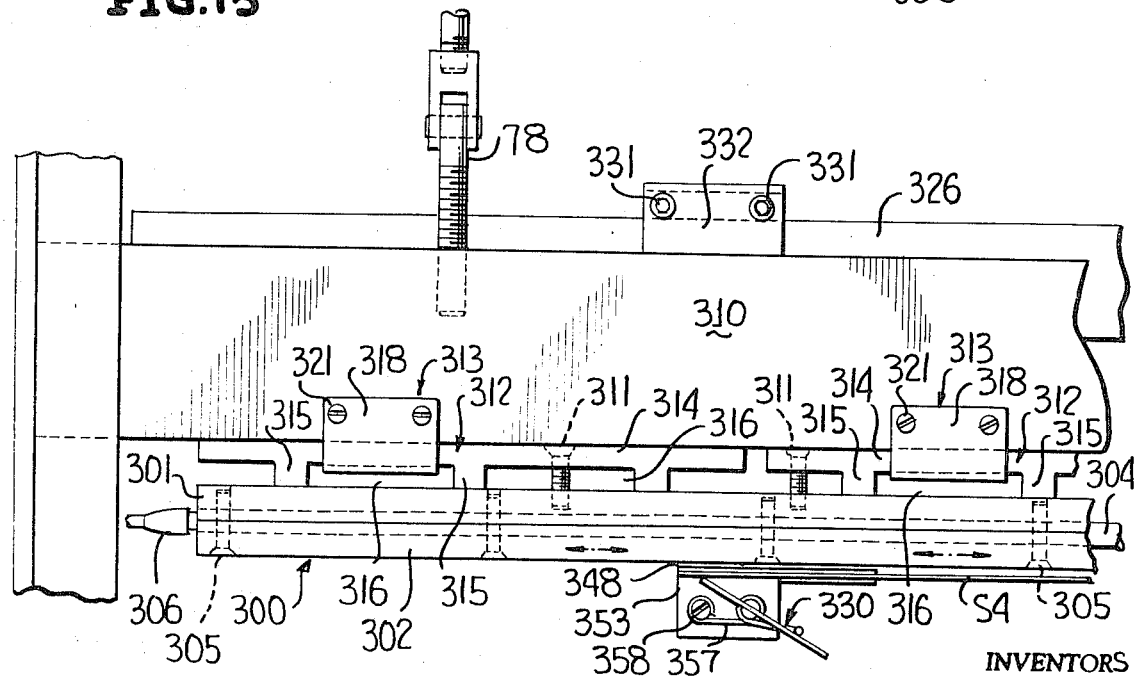

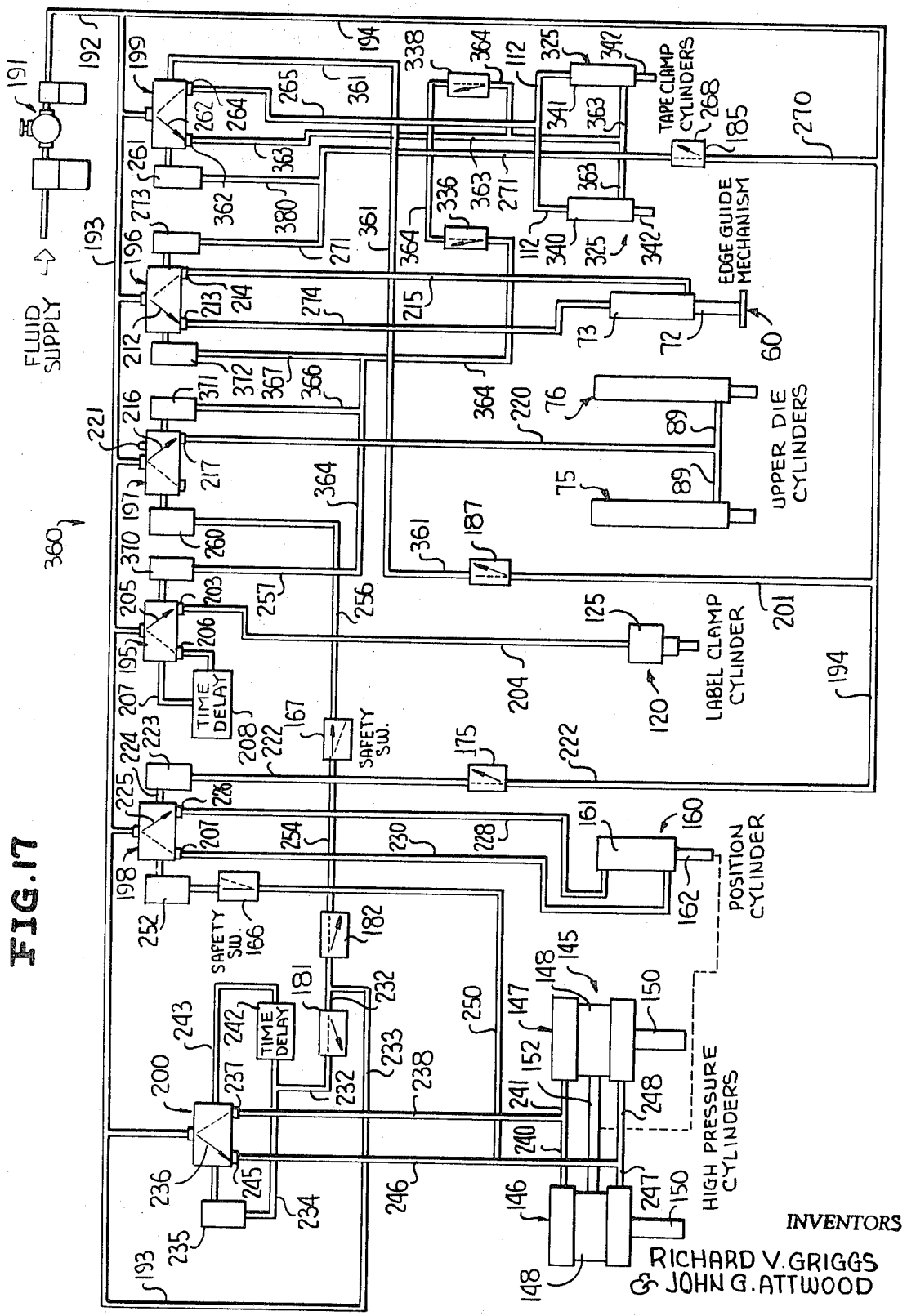

BONDING MACHINE FOR FABRICS WITH LOCATING AND AUXILIARY BONDING MEANS

In recent years the concept of uniting textile fabrics or similar sheet material by adhesive bonding as opposed to conventional sewing has created interest and activity in the garment industry. As opposed to conventional sewn seams, adhesive seams are generally cleaner, rejects are lower, thread breaking during sewing, washing or dry cleaning is eliminated, and the adhesive seams are generally stronger because of both the high bond strength of present-day adhesives and the larger area of bonded seams as opposed to sewn seams. An important production advantage resides in the fact that a long length of seam can be produced in a single operation requiring only a fraction of the time an operator would need for producing the same seam on a sewing machine, and far less skill is required for operating a bonding machine of the type hereinafter described as compared to conventional sewing machines. Furthermore insofar as the present invention is concerned a single operator can handle more than one bonding machine which results in additional savings in both time and money from a manufacturing standpoint.

The apparatus of the present invention is designed primarily for adhesively bonding a garment band or strip, such as a waistband, to the developed length of a garment body such as trousers, shorts, slips, etc., by thermosetting adhesives, although the particular garment components and the particular adhesives may be varied as found necessary or desirable. For example the apparatus can be equally adapted for adhesively uniting a shirt collar to a shirt body, pockets to a main garment, etc., by either thermosetting or thermoplastic adhesives which will hereinafter be referred to as "heat-activatable" since in one case (thermosetting adhesives) heating cures and sets the adhesive while in the other case (thermoplastic adhesives) the heating step necessary for adherence must be followed by cooling to solidify the bond.

In keeping with the latter comments it is a primary object of this invention to provide a novel apparatus for bonding sheets of fabric or like material by utilizing heat-activatable adhesives, the apparatus including a pair of relatively movable presser bars, means for locating a fabric sheet adjacent the lower and preferably stationary presser bar, means for clamping a second fabric sheet to the upper and preferably movable presser bar, and means for imparting movement to the upper presser bar to bring the fabric sheets into pressure contacting relationship whereby the application of heat causes adhesively contacting portions of the fabric sheets to bond to one another.

A further object of this invention is to provide a novel apparatus of the type heretofore described wherein means are provided for automatically deactivating the locating means prior to the application of pressure to the sheets by the presser bars, and means for automatically deactivating the clamping means prior to the return movement of the upper presser bar to prevent delamination of the bonded sheets.

A further object of this invention is to provide a novel apparatus of the type heretofore described wherein the means for securing the fabric sheet to the upper movable presser bar are preferably adjustable to permit sheets of different lengths to be carried by the upper presser bar.

Yet another object of this invention is to provide a novel apparatus for bonding fabric sheets to each other, the upper presser bar further including additional heat and pressure bonding means for adhesively bonding a label or similar sheet material to the fabric sheet carried by the upper presser bar prior to the bonding of the latter sheet to the fabric sheet supported by the lower presser bar.

Still another object of this invention is to provide fluid piston-cylinder means for urging the fabric sheets into intimate engagement during the bonding operation, the piston-cylinder means being normally disposed in a deactivated position relative to the upper presser bar, and means for moving the piston-cylinder means to an active position for imparting downward movement to the upper presser bar only upon the absence of a worker's hands or similar obstructions between the upper and lower presser bars.

A further object of this invention is the provision of apparatus of the type heretofore described wherein the operation of the various means and mechanisms of the apparatus is effected in accordance with an automatically controlled fluid circuit system.

A further object of this invention is to provide a novel method of bonding fabric sheets, particularly though not necessarily garment components, by providing a plurality of fabric sheets at least one of which is precoated with a heat-activatable adhesive, locating one of the sheets adjacent a lower heated presser bar, securing another of the sheets to the upper presser bar, imparting relative movement to the presser bars causing pressure contact between lapped edge portions of the sheets, heating the sheets to activate the adhesive and ultimately bond the sheets to each other, and automatically releasing the sheet carried by the upper presser bar to prevent delamination of the bond and permit the removal of the now-bonded sheets.

A further object of this invention is to provide a novel method including the steps heretofore described and additionally maintaining the heat applied to the sheets at a temperature not in excess of substantially 400° F.

Still a further object of this invention is to provide a novel method of the type set forth and further including the step of applying a label or similar sheet to one of the first-mentioned sheets prior to the bonding of the first-mentioned sheets to each other.

With the above and other objects in view that will hereinafter appear, the nature of the invention will be more clearly understood by reference to the following detailed description the appended claimed subject matter, and the several views illustrated in the accompanying drawings.

In the drawings:

FIG. 2 is a sectional view taken generally along line 2—2 of FIG. 1, and illustrates a pair of clamps for securing a strip of fabric to the underside of the upper presser bar, vacuum holddown means for supporting a fabric sheet with an edge thereof overlying the lower pressure bar, and a retractible locating mechanism for accurately aligning the edge of the sheet overlying the lower presser bar.

FIG. 3 is a side elevational view of the apparatus as viewed from right to left in FIGS. 1 and 2, and more clearly illustrates the inoperative position of the pair of piston-cylinder mechanisms with the pistons thereof out of alignment with the upper presser bar.

FIG. 4 is an enlarged fragmentary sectional view taken generally along line 4—4 of FIG. 2, and illustrates the operative position of the locating mechanism relative to the lower presser bar, and means for heating the lower presser bar.

FIG. 5 is a fragmentary sectional view taken generally along line 5—5 of FIG. 1, and illustrates means for moving the piston rods of the piston-cylinder mechanism into overlying alignment with an upper surface of the upper presser bar.

FIG. 6 is a highly enlarged fragmentary rear view taken generally along line 6—6 of FIG. 2, and illustrates one of a pair of clamping mechanisms for securing a strip of fabric material to the under surface of the upper presser bar.

FIG. 7 is a sectional view taken generally along line 7—7 of FIG. 6, and more clearly illustrates a spring-biased clamping member and a hydraulically actuated mechanism for automatically deactivating or unclamping the clamping member.

FIG. 8 is a highly enlarged fragmentary rear view taken generally along line 8—8 of FIG. 2, and illustrates a heat and pressure bonding mechanism carried by the upper presser bar for bonding a label or similar fabric strip to the undersurface of a strip secured to the upper presser bar by the clamping mechanisms.

FIG. 9 is a sectional view taken generally along line 9—9 of FIG. 8, and illustrates means for aligning both strips incident to the bonding thereof to each other.

FIG. 10 is a fragmentary sectional view similar to FIG. 2 with the upper presser bar thereof omitted, and more clearly illustrates the vacuum holddown means and thermostatic switch means associated with the lower presser bar.

FIG. 11 is a diagrammatic illustration of an automatic fluid circuit system for controlling the operation of various mechanisms of the bonding apparatus.

FIG. 12 is a side elevational view, partly in section, of another clamping mechanism of the invention, and illustrates a fabric strip clampingly secured in position prior to a bonding operation with a longitudinal edge portion of the strip underlying an upper presser bar.

FIG. 13 is a top plan view of the clamping mechanism of FIG. 12, and illustrates a bracket for securing the clamping mechanism to a support bar and a switch for selectively actuating a fluid motor for moving a clamping member from the bonding position of FIG. 12 to a loading position shown in phantom outline in FIG. 12.

FIG. 14 is a bottom view of the clamping mechanism, and illustrates a flange for accurately locating the fabric strip relative to the clamping member.

FIG. 15 is a front elevational view of portions of the apparatus, and illustrates a pair of heat-insulating members between the presser bar and the support bar.

FIG. 16 is a front elevational view of the clamping mechanism, and illustrates a channel for guiding the movement of the clamping member between bonding and loading positions.

FIG. 17 is a diagrammatic illustration of a fluid circuit system which includes means for controlling the movement of the clamping member between the bonding and loading positions.

Figure 1:
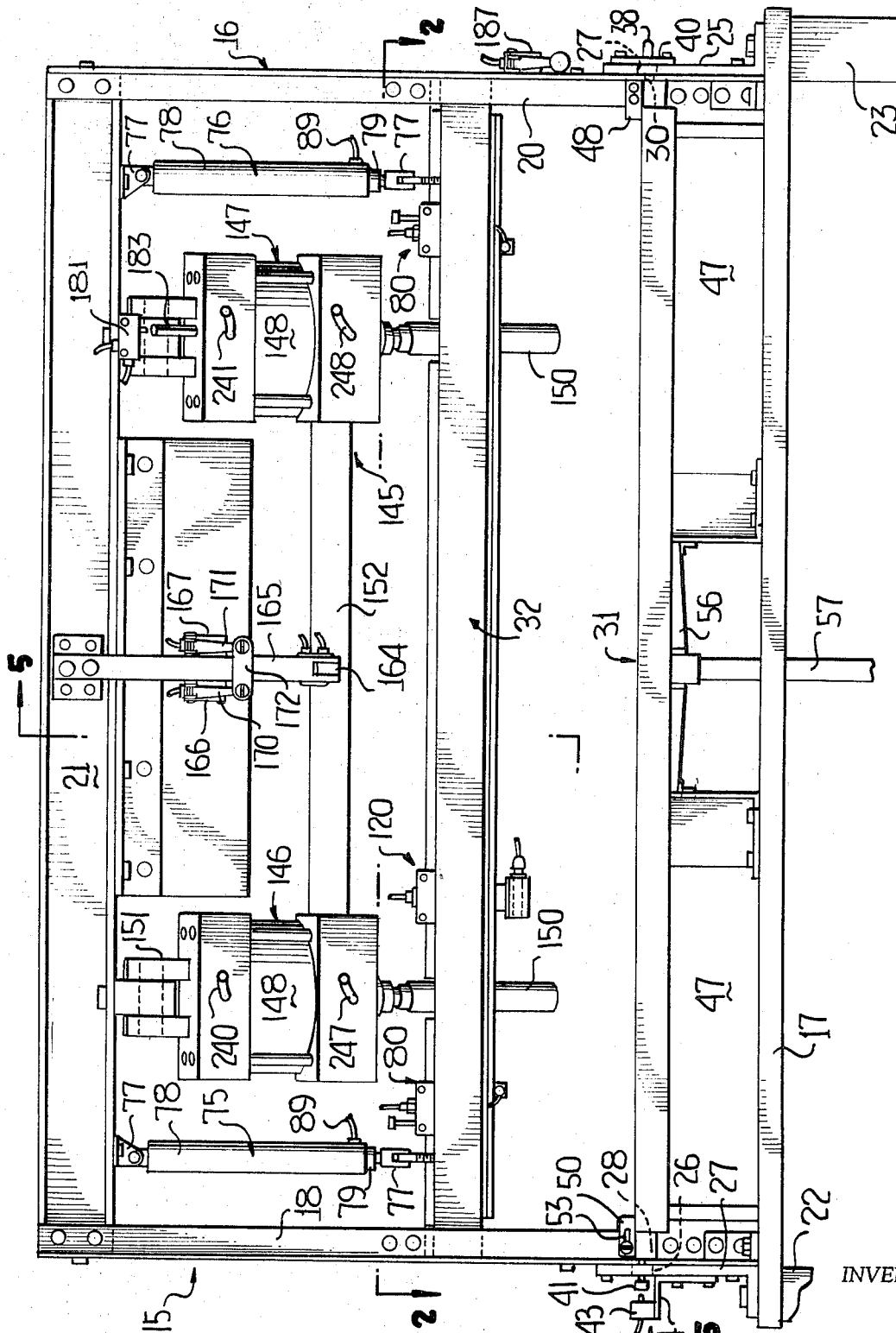
FIG. 1 is a fragmentary front elevational view of the novel bonding apparatus of this invention, and illustrates upper and lower presser bars, and a pair of fluid piston-cylinders in the inoperative positions thereof.

The general arrangement of the adhesive bonding machine or apparatus 15 of this invention is illustrated in FIGS. 1 through 3 and 5 of the drawings, and includes a frame 16 defined by a base 17, a pair of vertical channel members 18, 20 conventionally secured to the base 17, and an I-beam 21 connected to the upper terminal ends (unnumbered) of the channel members 18, 20.

In operation the base 17 is disposed in a horizontal plane at approximately waist-level of an operator by means of, for example, legs 22, 23, etc., of a lower portion (unnumbered) of the frame 16.

The frame 16 of the bonding apparatus 15 is rigidified by angle brackets 24, 25 secured conventionally between the base 17 and the respective channel members 18, 20. The brackets 24, 25 are provided with respective apertures 26, 27 which are in alignment with respective apertures 28, 30 formed in the bight portions (unnumbered) of the channel members 18, 20, respectively. The function of the apertures or openings 26–28 and 30 will become more apparent hereafter.

The apparatus 15 includes a pair of relatively movable means 31, 32 in the form of pressure-applying members of presser bars between which the fabric sheets are bonded together under the influence of heat and pressure. The presser bar 31 is stationary while the presser bar 32 is mounted for reciprocal guiding movement in the channel members 18, 20 in directions toward and away from the presser bar 31. The opposed surfaces (unnumbered) of the presser bars 31, 32 between which the fabric sheets are clamped during a bonding operation are preferably knurled or otherwise roughened to force the bonding substance into the interstices of the fabric sheets to assure the formation of a high-strength seam.

The presser bar 31 is formed of a pair of elongated metallic elements 33, 34 (FIG. 4) which are provided with semicylindrical opposing grooves (unnumbered) which together form a bore 35 in which is housed a heating element 36. The elements 33, 34 and 36 are secured in assembled relationship by a plurality of identical screws 37 which can be readily removed to repair or replace the heating element 36. An exposed end 38 (FIG. 1) of the heating element 36 is encased in a nonconducting sheath, and projects through the apertures 27, 30 as well as an aperture (unnumbered) in a plate 40 secured to the bracket 25. The end 38 of the heating element 36 is connected to a conventional power source (not shown) for heating the element 36 to a temperature range of between 350°–400° F. An opposite end 41 of the heating element 36 projects through the aligned apertures 26, 28 (FIG. 1) and is in alignment with a thermostatic control unit 42 which includes a switch arm (unnumbered) of a switch 43 supported in the manner illustrated in FIG. 1 by a plate 44 joined to the bracket 24. The switch 43 is designed to regulate the temperature of the heating element 36 and thus the temperature of the presser bar 31 in response to the expansion and contraction of the heating element 36, as will be explained more fully hereafter.

The presser bar 31 is seated upon a plurality of blocks 45 (FIG. 4) of insulating material which are in turn interconnected by a tongue-and-groove connection 46 to a plate 47 which runs the entire length of the presser bar 31 and is fixedly secured at opposite ends thereof by conventional brackets and bolts (unnumbered) to the channel members 18, 20 and the base 17, as is clearly illustrated in FIG. 1 of the drawings. The right-hand end of the lower presser bar 31 as viewed in FIGS. 1 and 10 of the drawings is fixedly secured to the channel member 20 by an L-shaped bracket 48 and screws (unnumbered). The opposite end of the presser bar 31 is secured to the channel member 18 by an L-shaped bracket 50 and screws 51, 52, the latter of which passes through an elongated slot 53 of the bracket 50 and is secured to a leg (unnumbered) of the channel member 18. The slot 53 of the bracket 50 compensates for the longitudinal expansion and contraction of the presser bar 31 due to the heating thereof by the element 36.

A vacuum manifold 54 (FIGS. 2, 4 and 1)) is positioned forwardly of the presser bar 31, and an upper surface (unnumbered) of the vacuum manifold 54 is substantially coplanar with and forms an extension of the upper surface (unnumbered) of the presser bar 31. A plurality of apertures 55 are formed in the upper wall (unnumbered) of the manifold 54 and extend along substantially the entire length thereof, as is best illustrated in FIGS. 2 and 10 of the drawings.

The vacuum manifold 54 is connected by a generally triangular duct 56 (FIG. 2) to a conduit 57 which is in turn connected to a vacuum source, such as a conventional vacuum pump. The function of the vacuum manifold 54 is to accurately maintain the edge portion of a fabric sheet upon the upper surface of the presser bar 31 during the bonding cycle of the apparatus 15, as will be explained fully hereafter.

A generally rectangular platform 58 (FIGS. 2–4) is supported above the duct 56 in a conventional manner, and an upper surface of the platform 58 is flush with the upper surfaces of the vacuum manifold 54 and the stationary presser bar 31. Thus, while the edge portion of a fabric sheet which is to be bonded is supported by the upper surface of the presser bar 31 and maintained in its position by the vacuum manifold 54, the remaining portion of larger garments can be positioned by and supported upon the platform 58.

Means for properly locating the marginal edge portion $E_1$ (FIG. 4) of a fabric sheet $S_1$ upon the stationary presser bar 31 is illustrated in FIGS. 2–4 of the drawings, and is generally designated by the reference numeral 60. The locating mechanism 60 includes a generally L-shaped plate 61 (FIG. 4) which is generally as long as and is disposed parallel to the longitudinal axis of the presser bar 31. The plate 61 has an upwardly directed leg 62 to which is secured a metallic backup plate 63 and a substantially straight edge guide 64 of nonheat conductive material whose upper edge projects above the upper surface of the presser bar 31. By placing the edge portion $E_1$ against the leftmost surface of the guide 64 as viewed in FIG. 4 the sheet $S_1$ is accurately located relative to the upper presser bar 32 and another sheet carried thereby as will be more apparent hereafter.

The plate 61 is secured by nuts and bolts (unnumbered) to a pair of angle brackets 65 which are in turn each secured by nuts and bolts (unnumbered) to upwardly disposed connecting bars 66 whose lower ends are welded or otherwise conventionally secured to an L-shaped bracket 67. The bracket 67 is in turn connected to slide blocks 68 slidably received in channels 70 of channel members 71 secured to the base 17. A rod 72 of a fluid piston-cylinder mechanism 73 is connected to the bracket 67 in the manner clearly illustrated in FIG. 4, and the piston (unnumbered) of the mechanism 72 is secured by a bracket 74 to the base 17. As the piston rod 72 is retracted the locating mechanism 60 is drawn to the right as viewed in FIG. 4 to an out of the way position during the descent of the upper presser bar 32, while opposite movement of the piston rod 72 repositions the locating means 50 in its operative or locating position, as shown in FIG. 4. The particular manner in which the piston rod 72 of the piston-cylinder mechanism 74 is reciprocated will be described fully hereafter in conjunction with the fluid circuit system of FIG. 11.

The upper presser bar 32 is suspended from the I-beam 21 by a pair of fluid piston-cylinder mechanisms 75, 76. The mechanism 75, 76 each includes brackets 77 articulately connecting each cylinder 78 and its associated piston rod 79 to the beam 21 and the presser bar 32, respectively. The presser bar 32 is moved from its uppermost position (FIG. 1) toward the lower presser bar 31 by venting the cylinders 78 of the mechanisms 75, 76 thus allowing gravity to slowly lower the presser bar 32 depending, of course, upon the speed at which the cylinders are vented. The presser bar 32 is retracted in an upward direction by the introduction of fluid into the cylinders 78 through conduits 89.

As was heretofore noted, the primary application of the apparatus 15 is to adhesively bond a waistband or similar strip or sheet of fabric material $S_2$ secured to the underside of and carried by the upper presser bar 32 to the sheet $S_1$ supported with its edge upon the lower presser bar 31. To this end the upper presser bar 32 is provided with a pair of identical means 80 (FIGS. 1, 6 and 7) for releasable clampingly securing the sheet $S_2$ to the presser bar 32. Referring particularly to FIGS. 6 and 7 of the drawings, each of the clamping means 80 includes a generally rectangular plate 81 positioned to the rear of the presser bar 32. The plate 81 is mounted for adjustable sliding movement along the length of the presser bar 32 by means of an inverted L-shaped bracket 82 and a pair of screws 83 which pass through the bracket 82 and are threadably secured in threaded apertures 84 of the plate 81. The upper portion of the plate 81 and the bracket 82 define a downwardly opening channel 85 into which is received the uppermost edge of a guide 86 fastened by screws 87 to the presser bar 32. The guide 86 runs the length of the presser bar 32 and by simply manipulating the screws 83 each of the clamping mechanisms 80 can be positioned desired distances from each other to accommodate sheets $S_2$ of different lengths, as will be more apparent hereafter.

A generally rectangular member 88 (FIG. 6) is secured by screws 90 to the plate 81, and a lower end portion of the member 88 is apertured for rotatably journaling a pin 91 of a clamping member 92. The clamping member 92 includes a pair of arms 93, 94 joined to each other by a transverse bridging portion 95 (FIG. 7). A lower end portion 93 of the clamping member 92 is connected to the pin 91 while the arm 94 at its terminal end is connected by a spring 96 to a leg 97 of a generally C-shaped bracket 98 secured to the plate 81 by screws 100 (FIG. 7). The upward biasing force of the spring 96 tends to normally rotate the clamping member 92 in a clockwise direction as viewed in FIG. 6 about the pin 91 thus bringing an end portion 101 of the arm 93 into clamping engagement with the strip $S_2$, in the manner best illustrated in Fig. 7 of the drawings.

The clamping member 92 is manually moved to an open position by means of a plunger 102 mounted for reciprocal movement in apertures (unnumbered) of the leg 97 and a leg 103 of the C-shaped bracket 98. A spring 104 acting against an abutment 105 fixedly secured to the plunger 102 normally urges the plunger 102 to the uppermost position illustrated in FIGS. 6 and 7 at which an end 106 of the plunger 102 is normally spaced above the leg 94 of the clamping member 92. Upon exerting a manual downward force upon the plunger 102 against the bias of the spring 104 the end 106 contacts the leg 94 of the clamping member 92 causing counterclockwise pivoting thereof as viewed in FIG. 6 to move the end portion 101 of the leg 93 away from the presser bar 32. In this position the sheet $S_2$ can be positioned in the manner illustrated in FIGS 6 and 7 at which time the plunger 102 is released and the spring 104 urges the plunger 102 to the position illustrated in FIGS. 6 and 7 while the spring 96 draws the end portion 101 into clamping contact with the underside surface of the strip $S_2$.

The clamping member 92 is also actuated by pneumatic means in the form of a fluid piston-cylinder mechanism 107 which includes a cylinder 108 connected to a leg 110 integrally formed from the bracket 98 and disposed normal to the plate 81. A lower threaded end portion 111 of a piston rod carries a nut 119 which limits the upper or retracting movement of the piston which may, for example, take place under the influence of a spring (not shown) internally of the cylinder 108. The piston is activated by the introduction of fluid pressure from a source (not shown) through a conduit 112 into the cylinder 108 which urges the end portion 111 downwardly causing the counterclockwise pivoting of the clamping member 92 to open the clamping end portion 101 thereof. Upon the venting of the cylinder 108 in a manner to be described fully hereinafter relative to FIG. 11 the spring (not shown) internally of the cylinder 108 retracts the piston 111 causing the clamping member 92 to move to its clamping position under the influence of the spring 96.

The upper presser bar 32 is not provided with individual heating means, as in the case of the lower presser bar 31, and it is therefore desirable to provide the presser bar 32 with an insulating plate 113 (FIG. 7) of nonconductive and pressure-resistant material. The plate 113 is substantially as long as the presser bar 32 and is secured thereto by a plurality of identical screws 114. The under surface of the plate 113 is preferably knurled, as is the uppermost surface of the lower presser bar 31, to obtain better bonds between the strips $S_1$, $S_2$ by forcing the adhesive bonding material into the interstices of the fabric sheets as they are joined together.

The upper presser bar 32 is also provided with locating means 115 in the form of an inverted generally L-shaped bracket having one leg (unnumbered) secured to the upper surface of the plate 113 by a plurality of identical screws 116, and another leg 117 projecting below the plate 113, in the manner best illustrated in FIG. 7 of the drawings. The locating bracket 115 similarly runs generally the entire length of the upper presser bar 32 and therefore locates strips $S_2$ of varying lengths by an operator merely contacting the rightmost edge (unnumbered) of the strip $S_2$ against the leg 117 when the clamping member 92 is in its open position.

In addition to the two adjustable clamping mechanisms 80, 80 carried by the presser bar 32 to secure strips $S_2$ of varying lengths to the undersurface of the presser bar 32, the latter is also provided with additional bonding means 120 (FIGS. 1, 8 and 9) for heat and pressure bonding another fabric sheet $S_3$, such as a label, to the sheet $S_2$, prior to or simultaneously with the bonding of sheets $S_1$–$S_2$ to each other.

The bonding mechanism 120 is similarly mounted for adjustable sliding movement upon the rail 86 of the presser bar 32 by means of an inverted generally L-shaped plate 121 fastened by screws 122 to a plate 123 carrying a cylinder 124 of a piston-cylinder mechanism 125. A generally U-shaped channel member 126 is secured by screws 127 (only one of which is illustrated) to diametrically opposite flanges 128 of the cylinder 124. A generally inverted L-shaped pressure-applying member or body 130 includes a vertically disposed leg 131 guidably confined in the channel member 126 and which is also secured at its upper end portion to a piston rod 129 of the mechanism 125.

A horizontally disposed leg 132 of the body 130 is provided with means generally designated by the reference numeral 133 for locating the label or a similar sheet $S_3$ at a desired position with respect to the sheet $S_2$. The locating mechanism 133 includes an elongated locating member or guide plate 134 carried by a block 135 mounted for vertical reciprocal movement in a chamber 136 of the leg 132. Upward movement of the block 135 is limited by a screw 137 while a spring 138 normally biases the block 135 and the guide plate 134 carried thereby in an upward direction as viewed in FIG. 9.

Assuming fluid is introduced into the cylinder 124 the piston rod 129 thereof is moved downwardly to position the leg 132 with its uppermost surface (unnumbered) in spaced relationship to the sheet $S_2$ clampingly secured to the presser bar 32 by the clamping mechanisms 80. At this time the body 135 and the guide plate 134 carried thereby are in uppermost position due to the biasing force of the spring 138. The label $S_3$ is then inserted until its right-handmost edge (unnumbered) contacts the guide plate 134, after which the piston rod 129 is retracted into the cylinder 124 to draw the leg 132 upwardly bringing the sheets $S_2$, $S_3$ in pressure contacting relationship. During this upward movement the guide plate 134 contacts the sheet $S_3$ and yields or moves downwardly along with the body 135 against the influence of the spring 138. Either and/or both of the sheets $S_2$, $S_3$ carry heat-activatable adhesive on the contacting surfaces thereof, and the adhesive is activated by means of a conventional electrical heating element 140 received in a bore 141 of the leg 132. The heating element 140 is connected to a conventional thermostatic heat control system (not shown) so as to maintain the temperature of the leg 132 approximately between 350°–400° F.

Reference is now made to FIGS. 1, 3 and 5 of the drawings which illustrate means 145 for urging the presser bar 32 toward the presser bar 31 to bring the sheets $S_1$, $S_2$ into pressure contacting relationship. As was heretofore noted, the downward movement of the presser bar 32 is initiated by venting the cylinders 78 of the mechanisms 75, 76 to the atmosphere causing the gradual downward movement of the presser bar 32 from the fully retracted position illustrated in FIG. 1. However, after the presser bar 32 is positioned closely adjacent the presser bar 31 the mechanism 145 is activated to apply a force to the presser bar 32 beyond that of gravity to assure the intimate bonding of the sheets $S_1$, $S_2$.

The mechanisms 145 includes a pair of identical fluid piston-cylinder mechanisms 146, 147, each of which includes a cylinder 148 and a piston rod 150. The cylinders 148 are each pivotally secured by conventional means 151 to the I-beam 21, and are connected to each other by a beam 152. In the inactive position of the mechanism 145 the piston rods 150 are disposed at an angle to, rearwardly of and below the upper presser bar 32, as is shown in FIGS. 1, 3 and 5 of the drawings. If in this position the mechanisms 146, 147 were inadvertently or accidentally actuated the piston rods 150 would simply move in a downward direction without in any way imparting motion to the presser bar 32. It is not until the upper presser bar 32 reaches a position closely adjacent the position of the presser bar 31 that the mechanism 145 is moved to a position at which the piston rods 150 directly overlie the presser bar 32 and are capable of urging the same downwardly under the influence of fluid pressure in the cylinders 148.

The mechanisms for moving the piston-cylinder mechanisms 146, 147 to a position at which the piston rods 150 are in overlying relationship to the presser bar 32 is generally designated by the reference numeral 160 (FIGS. 1 and 2) and includes a fluid cylinder 161 having a piston rod 162 pivotally connected to a bracket 163 which is in turn welded or otherwise conventionally secured to the beam 152. The cylinder 161 is also pivotally connected at 164 to a stationary vertical beam 165 secured at its upper end in a conventional manner to the I-beam 21. A pair of switches 166, 167 each having switch arms 168 are connected to opposite sides of the beam 165. A pair of pivotable switch arms 170, 171 are joined to each other at their terminal ends by a cross plate 172.

Upon pushing the cross plate 172 toward the beam 165 the switches 166, 167 are actuated if and only if the presser bar 32 is in a predetermined position closely adjacent the presser bar 31. Assuming the presser bar 32 is so positioned by virtue of the gradual descent thereof upon the venting of the mechanisms 75, 76, fluid is introduced into the cylinder 161 causing the retraction of the piston rod 162 which brings the piston rods 150 into overlying relationship to the upper surface of the presser bar 32. Thereafter fluid is introduced into the cylinders 148 to urge the piston rods 150 downwardly thus applying the necessary pressure to effect the bonding of the sheets $S_1$, $S_2$.

The mechanism for detecting the position of the presser bar 32 relative to the presser bar 31 is a switch 175 having an arm 176 (FIG. 3) in alignment for contact by a plunger 177 carried by a bracket 178 which is in turn secured to the upper presser bar 32 in a conventional manner. The engagement of the switch arm 176 is effected when the presser bar 32 is almost at its most downward position, and the mounting of the plunger 177 upon the bracket 178 is such as to provide for some resiliency so that the switch 175 cannot be damaged by the impact of the descending plunger 177. The plunger 177 is preferably slidably received in an aperture of the bracket 178 and is biased downwardly by a spring 180. The upper end of the plunger 177 carries a stop nut and a locknut, the rotation and adjustment of which can vary the length of the plunger to determine the distance or space between the presser bars 31, 32 at which the switch 175 is actuated to activate the mechanism 160, as will be apparent more fully hereafter during the description of the typical operation of the apparatus 15.

In addition to various components heretofore described, the apparatus 15 also includes several switches which are operative in conjunction with a fluid circuit system 190 (FIG. 11) for assuring the automatic and safe operation of the apparatus. A pair of switches 181, 182 (FIG. 3) are secured to the I-beam 21 in alignment for actuation by respective plungers 183, 184 carried by the piston-cylinder 147. It should be noted that the switch 181 is actuated by the plunger 183 only when the piston rods 150 of the mechanism 145 are in alignment with the upper presser bar 32, while the switch 182 is actuated by the plunger 184 only when the mechanism 145 is in its deactivated position (FIG. 3) in which the piston rods 150 are disposed to the rear of the presser bar 32.

A switch 185 (FIG. 3) is secured by a bracket (unnumbered) to the channel member 16 in an alignment for contact with the bracket 178 carried by the upper presser bar 32. Thus, as the upper presser bar 32 moves to its uppermost position the switch 185 is activated to operate the clamping mechanisms 80 by closing the same, and to also effect the movement of the guide mechanism 60 toward the lower presser bar 31.

Finally, a starter switch 187 having an actuator 188 is mounted on the channel member 16. The depression of the actuator 188 by an operator initiates the operation of the apparatus 15, in which will be described immediately hereafter in conjunction with the fluid circuit system 190 of FIG. 11.

OPERATING CYCLE

The fluid control system 190 of the apparatus 15, with the exception of the electrical circuits and pertaining components that are necessary for supplying electrical current to the heating elements 36 and 140, is completely fluid powered. This system comprises a circuitry of conduits all of which are connected to a main source of high-pressure fluid. In particular, the circuitry is made up of a number of specific circuits which serve to control the various fluid power devices of the apparatus by way of so-called primary and secondary fluid control means, and in most cases the control functions of the various valves are fully automatic and in accordance with a predetermined operating cycle of the apparatus.

For the purpose of describing a typical cycle of the apparatus 15, it is assumed that the apparatus is in an inactive condition with the upper presser bar 32 raised to its inactive position (FIG. 1) and the locating means 60 (FIG. 4) in its operative position. It will also be assumed that the lower surface (unnumbered) of the fabric sheet $S_2$ is provided with heat-activatable adhesive means which is preferably of a conventional thermosetting nature, and that the heating elements 36, 140 are appropriately energized and heated through a conventional electrical circuit (not shown) anytime or after the sheets $S_1$, $S_2$ are under pressure via the mechanisms 120 and the sheets $S_1$, $S_2$ are clamped between the presser bars 31, 32.

The sheet $S_2$ which is, for example, a garment band is secured to the upper presser bar 32 by an operator first manually depressing one of the plungers 102 (FIGS. 6 and 7) of its associated clamping mechanism 80 to space the clamping leg 101 away from the under surface of the presser bar plate 113. A first end of the sheet $S_2$ is placed between the leg 101 and the plate 113 with the right-handmost edge as viewed in FIG. 7 against the locating leg 117 of the bracket 115. Upon the release of the plunger 102 the spring 96 automatically moves the clamping member 92 to the position illustrated in FIG. 7 thus clamping one end of the sheet $S_2$ to the presser bar 32. By slightly stretching the sheet $S_2$ so that latter lies flat against the under surface of the plate 113 the operator then clamps the other end of the sheet $S_2$ by the clamping means 80 in the manner just described. The distance of the clamping means 80, 80 from each other is, of course, preferably set prior to performing the clamping operations heretofore described.

The operator then places the sheet $S_3$ (FIG. 9) which is, for example, a label upon the upper surface (unnumbered) of the leg 132 of the bonding mechanism 120 which at this phase of the cycle is in its open position. The label $S_3$ is thus positioned in opposing relationship to the adhesively coated under surface of the garment band $S_2$ and with the rightmost edge (unnumbered) as viewed in FIG. 9 in contact with the movable guide plate 134.

With the garment band $S_2$ and the label $S_3$ in position, the operator now lays the developed length of the garment $S_1$ upon the platform 58, and accurately positions the marginal edge portion $E_1$ thereof on the lower presser bar 31 by means of the guide plate 64 (FIG. 4) of the mechanism 60. At this point the edge $E_1$ is below and in vertical alignment with the edge $E_2$ (FIG. 7) of the garment band $S_2$, it being noted that both the leg 132 of the bonding mechanism 120 and each of the legs 93 of the clamping mechanisms 80 are positioned at the rearward half of the presser bar width, thus positioning only the forward half of the upper presser bar width in overlying relationship with the lower presser bar 31. Thus, upon the closing of the presser bars 31, 32 no interference between the clamping means 80 or the bonding mechanism 120 with the lower presser bar 31 is encountered.

If the garment $S_1$ has, for example, a cross seam, a thin shim could be secured to the knurled surface of the lower presser bar 31 directly beneath the cross seam and/or to the knurled surface of the upper presser bar 32 in alignment with the cross seam. Such shims would, upon the closing of the presser bars, thereby provide additional pressure to better force the adhesive into the fabric at the cross seam or similar bulgy portions of the fabric.

The fabric sheet $S_1$ is, of course, retained in its aligned position upon the platform 58 nd the lower presser bar 31 by means of the vacuum drawn through the manifold 54, the duct 56 and the conduit 57.

The fluid control system 190 includes a conventional filter-pressure-regulator-lubricator 191, a main supply line 192 and a pair of branch lines or conduits 193, 194 which are under pressure prior to the actuation of the switch 187. The branch line 193 supplies compressed air to six primary control valves 195 through 200 which are equipped with exhaust valves to prevent the entrapment of compressed air in closed lines, while the branch line 194 directs the air to several secondary control valves, as will be explained hereafter.

The apparatus 15 is started by the operator depressing the starter switch arm 188 of the switch 187 whereupon high-pressure fluid is conducted upwardly from the line 194 through a line 201, the switch 187, and a line 202 to the primary control valve 195. Before any high-pressure fluid is connected to the valve 195 through the line 202 the valve 195 was set in such a manner that the fluid was conducted through the line 193, the valve 195, a port 203 and a line 204 to a cylinder 124 (FIG. 9) of the label-bonding mechanism 120. In this condition the leg 132 of the member 130 was lowered and maintained in is lowered position for receiving the label or similar material $S_3$. Due to the fact that high pressure is now conducted through the line 202 a control element 205 of the valve 195 is readjusted so that the fluid flow to the cylinder 124 is cut off and is directed via a port 206 into a line 207 which contains a conventional time delay device 208. The time delay device 208 functions as a normally closed switch which will open after the lapse of a predetermined period of time measured from the moment at which a first rush of the fluid is conducted into the line 207 through the port 206. However, for the present time the line 207 remains closed by means of the switch 208 and the cylinder 124 is thereby no longer under pressure whereby the spring (not shown) within the cylinder 124 causes the clamp member 130 to engage the under surface of the upper presser bar 32. At this time the heating element 140 is energized to activate the adhesive and pressure-bond the sheets $S_1$, $S_2$ to each other.

Simultaneously with the flow of fluid through the lines 201, 202 fluid also flows to the valves 196, 197 through a line 210 and a branch line 211 connected thereto (FIG. 11). Thus, simultaneously with the closing of the bonding mechanism 125 the fluid in the line 210 moves an actuator 212 of the valve 196 to a position at which the flow of fluid from the line 193 through a port 213 is cut off and instead the fluid flows from the line 193 through the valve 196, a port 214 and a line 215 to the cylinder 73 causing the piston rod 72 to be retracted to move the locating mechanism 60 away from the lower presser bar 31.

As was mentioned, the valve 197 is actuated by fluid through the line 211 to shift a control element 216 thereof from a port 217 to a port 218 which is permanently closed. This cuts off the flow of high-pressure fluid through a line 220 to the conduits 89, 89 of the cylinders 78 of each of the mechanisms 75, 76 (FIG. 1) and places the line 220 in fluid communication with atmosphere through a vent port 221. With the fluid exhausting out of the cylinders 78, 78 of each of the mechanisms 75, 76 through the line 220 and the vent port 221 the upper presser bar 32 descends under the influence of gravity toward the lower presser bar 31. The speed at which the upper presser bar descends may, of course, be controlled by the speed at which the fluid exhausts from the port 221 by conventional adjustable valving means (not shown) associated therewith.

As the presser bar 32 descends the plunger 177 (FIG. 3) carried thereby contacts and moves the switch arm 176 of the switch 175 which is positioned in a branch line 222 of the line 194 (FIG. 11). The line 222 is connected via an impulse relay valve 223 and a conduit 224 to the primary control valve 198. Pressure in the line 222 upon the closing of the switch 175 moves an actuator 225 of the valve 198 to direct the flow of high-pressure fluid away from a port 226 and through a port 227. Prior to this movement of the actuator 225 high-pressure fluid from the line 193 was conducted through the valve 198, the port 226 and a line 228 (FIG. 5) to the cylinder 161 of the mechanism 160 causing the outward movement of the piston rod 162 which in turn maintains the piston rods 150 of the mechanism 145 in nonalignment with the upper presser bar 32. As long as the actuating or control element 225 of the valve 198 is in position opening through the port 226 high-pressure fluid conducted through the line 228 maintains the piston rod 162 extended tilting the cylinders 148 of the mechanisms 146, 147 backwardly or rearwardly to the inoperative position thereof illustrated in FIGS. 3 and 5. However, after the shifting of the element 225 of the valve 198 to direct the high-pressure fluid from the line 193 via the port 227 to a line 230 (FIG. 5) the fluid pressure acts against the piston (not shown) of the piston rod 162 to retract the rod 162 into the cylinder 161 swinging the mechanisms 146, 147 and the pistons 150 thereof forwardly into overlying alignment with the upper presser bar 32.

As was heretofore noted, provisions have been made in accordance with this invention for a number of safety features as, for example, the necessity of the upper presser bar 32 to descend fully down upon the inserted sheets $S_1$, $S_2$ before the switch 175 can be actuated by the plunger 177 to initiate the positioning of the mechanism 145 to its operative position with the pistons 150 thereof in overlying relationship to the upper presser bar 32. In addition, the structural design of the upper presser bar 32 is such that the piston rods 150 are constrained against swinging into a position of overlying alignment with the presser bar 32 until the latter has fully completed its descent. These features are important because of the extremely high pressure which is utilized in actuating the mechanisms 146, 147. In addition, special precaution is provided against any possible malfunctioning of the safety devices just noted by means of a fluid circuit which includes the switch 181 (FIG. 3 and 11) which controls the operation of the mechanisms 146, 147 by governing the direction of the flow of high-pressure fluid to the cylinders 148. The switch 181 operates somewhat in conjunction with the switch 182 (FIG. 3) which controls the return of the upper presser bar 32 to its elevated or starting position, and the opening of the clamp members 101 of the clamping mechanisms 92 (FIGS. 6 and 7), as will appear more clearly hereafter.

The switch 181 is arranged in a fluid supply line 232 one side of which is connected by a line 233 to the line 193 and an opposite side of which is connected by a line 234 to an impulse relay valve 235. The valve 235 controls the position of an element 236 of the valve 200 between the solid and phantom outline positions shown in FIG. 11.

If the switch 181 is closed by the contact of the arm thereof (unnumbered) by the post 183 (FIG. 3) high-pressure fluid from the upper branch line 193 is conducted through the line 232, the switch 181, the line 234 and the valve 235 causing the latter to shift the control element 236 of the valve 200 to direct high pressure from the line 193 through the valve 200, a port 237, a line 238 and lines 240, 241 (FIG. 1) to the cylinders 148 of the respective mechanism 146, 147 causing the rods 150 thereof to extend thus clamping the sheets $S_1$, $S_2$ therebetween and effecting the bonding thereof during the energizing of the heating element 36. It should be noted that if the switch 181 was not actuated for any reason the operation of the mechanisms 146, 147 is impossible and, was heretofore noted, the actuation of the switch 181 is impossible if the piston rods 150, 150 are not in overlying alignment with the presser bar 32.

Simultaneously with the actuation of the valve 235 a time delay 242 in a line 243 is also actuated, the line 243 being adapted to conduct high-pressure fluid to the valve 200 for changing the position of the control element 236 when the time delay device 242, which functions as a normally open switch, causes the opening of the line 243. This occurs only after a predetermined preselected time cycle which starts with the actuation of the time delay device 242. The time delay device 242 is, of course, actuated only upon the closing of the switch 181. Thus, after the device 242 times out the control element 236 is shifted to direct high pressure from the line 193 through the valve 200, a port 245, a line 246, and lines 247, 248 to cause the retracting movement of the pistons 150.

The high fluid pressure in the line 246 is also conducted via a line 250 through the switch 166 which is connected with an impulse relay valve 252. The impulse relay valve 252 shifts the control element 225 of the valve 198 in such a manner that the fluid to the cylinder 161 which controls the cylinders 148, is reversed to now flow through the port 226, the line 228 and into the cylinder to cause the outward movement of the piston rod 162 whereby the mechanism 145 is again swung rearward and out of alignment with the upper presser bar 32.

During the movement of the mechanism 145 to its inoperative position (FIG. 3) the switch 181 returns to its normal position closing the lines 232, 243 while the switch 182 is closed by contact with the actuating bar 184. The control element 236 of the valve 200 remains unchanged in its present position communicating with the line 246 under high pressure from the line 193 through the valve 200. However, upon the actuation of the switch 182 fluid is communicated from the line 193 through the line 233, the line 232 and the switch 182 to a line 254 which includes the switch 167. The switch 167 is normally closed and is connected by a line 256 to lines 257, 258. The line 257 is connected to an impulse valve 260 while the line 258 is connected to an impulse valve 261. With high-pressure fluid now in the lines 256, 257 and 258 the impulse relay valves 260, 261 are actuated to shift the control elements 216, 262 respectively, back into their original operating positions. In particular, the control element 216 of the valve 197 assumes a position wherein the high-pressure fluid is conducted from the line 193 via the valve 197, the valve port 217, the line 220 and the lines 89 to the cylinders 78 of the mechanisms 75, 76 causing the upper presser bar 32 to be raised. The impulse generated by the impulse valve 261 causes the return of the control element 262 to its original position reestablishing a fluid circuit from the line 193 via a port 264, a line 265 and the lines or conduits 112, 112 (FIG. 7) to the cylinders 108 of each of the clamp means or securing mechanisms 80. The fluid within the cylinders 108 causes the pistons 111 to extend actuating the clamping members 92 thereby opening the latter and releasing the garment band $S_2$ prior to the upward movement of the upper pressure bar 32. The bonded sheets $S_1$–$S_3$ may now be removed by the operator.

When the upper presser bar 32 has fully returned to its original elevated position the bracket 178 (FIG. 3) carried thereby actuates the switch 185 causing its control element 268 to close so that high-pressure fluid can now flow from the lower line 194 through a line 270 through and into lines 271, 272. The pressure in the line 272 actuates the control element 262 of the valve 199 such that the flow of fluid to the cylinders 108 via the line 265 is cut off. Thus, the clamping members 92 are again closed as the piston rod 111 of each is retracted and the leg 101 of each engages the under surface of the presser bar 32.

The high-fluid pressure in the line 271 causes the activation of an impulse valve 273 whereby the position of the control element 212 of the valve 196 allows he fluid to flow from line 193 through the valve 196 and the port 213 into the cylinder 73 via a line 274 to move the locating mechanism 60 to its operative position (FIG. 4).

It is pointed out that the preselected time cycle for the time delay valve 208 is shorter than that of the time delay valve 242 thus causing the release of the bonded sheets by opening the clamping members 92 of the mechanisms 80 prior to the retraction of the upper presser bar 32 under the influence of the mechanisms 75, 76 in the manner heretofore described, thus preventing the sheets $S_1$, $S_2$ from tearing or delaminating as might otherwise occur.

It is to be noted that the switches 166, 167 (FIGS. 1 and 11) are interconnected with one another by the connecting plate 172 in the manner heretofore described such that neither switch can be activated individually. Referring again to FIG. 11, the switches 166, 167 are illustrated as being arranged in that portion of the fluid circuit system which controls the position of the positioning mechanism 160 (FIG. 5), the upper presser bar moving mechanism 145, and each of the clamping means 80. The switch 166 is arranged in the line 250 leading to the impulse relay valve 252 of the primary control valve 198 while the switch 167 is arranged in the line 256 and the branch lines 257, 258 thereof leading to the impulse valves 260, 261. From this arrangement of the switches 166, 167 the same cannot be effectively operated after the mechanism 145 has been swung fully forward to its position of alignment with the piston rods 150 thereof in overlying relationship to the upper presser bar 32. This is due to the fact that under the established conditions of the fluid circuit system the fluid flow to the line with which the safety switches 166, 167 are associated is cut off at the moment when the air cylinders have swung forward. Thus, the switch 181 will be closed and the relay impulse valve 235 actuated causing the control element 236 of the primary control valve 200 to be shifted so that the airflow through the lines 246, 250 with which the safety switch 166 is associated is cut off. The switch 182 on the other hand is disengaged and is opened simultaneously when the switch 181 is engaged and closed. This means that the flow of fluid via the line 233 to the line 254 is interrupted by the opening of the switch 182. Thus, the safety switch 167 arranged in the line 254 becomes ineffective as long as the switch 182 is open. However, if the safety switches 166, 167 are actuated before the mechanism 145 has moved forward sufficiently to cause the engagement of the switch 181 by the actuating element 183 then the various mechanisms are effective in reversing the entire operational processes by creating an impulse in the valves 252, 260 and 261.

The impulse imparted to the valve 252 will cause the shifting of the control element 225 of the valve 198 and reverse the flow direction of the fluid to the positioning cylinder 161 of the mechanism 160 (FIG. 5) causing the rearward swinging of the cylinders 148 and the subsequent closing of the switch 182. In addition the impulse imparted to the valve 260 will cause the shifting of the control element 216 of the valve 197 so that the flow of the fluid is directed to the port 217, the line 220 and the conduits 82 resulting in the raising of the upper presser bar 32. Finally, the impulse imparted to the valve 261 will cause the flow of the fluid to the cylinders 108 of the clamping mechanism 89 which will result in the opening of the clamping members 92, thus completing the cycle and restoring the entire apparatus to its starting position.

It should be understood that the various safety mechanisms heretofore described are operative for the purpose of returning the apparatus to its starting position if, for example, the proper operation of the apparatus is disturbed such as when an alien object or the head of the operator is between the presser bars 31, 32 after the starter switch 187 has been activated. In such case the presser bar 32 cannot be lowered completely and the high-pressure-applying mechanisms 146, 147 are prevented from swinging entirely forward so that the system is set for operating the safety switches 166, 167 to return the apparatus to its original position.

While the operation of the apparatus 15 has been heretofore described in conjunction with the bonding of the sheet $S_1$ (FIG. 4) having a straight edge or edge portion the developed $E_1$, a significant aspect of this invention is the adaptability of the apparatus to bond fabrics, particularly knit goods, which have curved marginal edges corresponding to the edge $E_1$ of the sheet $S_1$. For example, assuming that the sheet $S_1$ is the developed length of a woman's knitted skirt having a curved edge $E_1$ to which a waistband $S_2$ is to be secured, the locating mechanism 60 is positioned with the straight edge guide 64 in a position shown in FIG. 4 immediately adjacent the lower presser bar 31. Assuming the vacuum manifold 54 is under negative pressure the slightly curved marginal edge $E_1$ is stretched, straightened and positioned against the straight edge guide 64, and is temporarily held in this position by the vacuum mechanism 54.

At the completion of the bonding operation which unites the waistband $S_2$ to the temporarily straightened edge $E_1$, the presser bars are moved to their open position and the vacuum is cut off in a conventional manner. The now-bonded sheets $S_1$ and $S_2$ can be removed and other sheets may thereafter be bonded to each other as desired. Thus, even though the edge guide 64 is completely straight both slightly convexly and concavely curved marginal edges of fabric can be bonded by the apparatus 15, in the manner just described.

Referring to FIGS. 6 and 7 of the drawings, it will be recalled that the upper presser bar 32 of the apparatus 15 carries a pair of clamping mechanisms 80, the clamping members 92 of which secure the fabric sheet $S_2$ to the underside of the presser bar. Since the presser bar 32 is not heated and because the heat of a bonding operation dissipates relatively quickly, there is little chance of an operator becoming burned while positioning fabric in the clamping mechanisms 80, although this may occur when the apparatus is operated rapidly and continuously at relatively high temperatures for an appreciable length of time. Furthermore, it is possible to directly heat the presser bar 32 in addition to or as an alternative to the direct heating of the presser bar 31. In the latter case the likelihood of an operator becoming burned by, for example, simply accidentally touching the heated presser bar 32 during a clamping operation is increased. However, in accordance with a further embodiment of this invention, the latter problem is substantially eliminated, and in this regard reference is now made to FIGS. 12 through 16 of the drawings and the following description in which like numerals will be used for designating like elements of the apparatus 15 and parts thereof.

An upper presser bar 300 (FIG. 12) corresponds somewhat to the lower presser bar 31 of the apparatus 15 and includes a pair of elongated metallic elements 301, 302 which are provided with semicylindrical opposing grooves (unnumbered) which together form a bore 303 in which is housed a heating element 304. The elements 301, 302 are secured together by a plurality of identical screws 305, while an exposed end 306 (FIG. 15) of the heating element 304 is electrically connected to a conventional thermostatically controlled power source in the manner described heretofore relative to the heating element 36. A working surface 307 of the element 302 is knurled or otherwise roughened while a rearward portion of the element 302 is relieved to form a smooth surface 308 along the entire length of the presser bar.

The presser bar 300 is secured to a vertically reciprocal support bar 310 by a plurality of identical screws 311, heat-insulating members 312 and U-shaped brackets 313 (FIGS. 12 and 15). Each of the members 312 includes a base 314 from which depend a plurality of spaced legs 315 between adjacent pairs of which are defined channels 316. The screws 311 pass through the bases 314 and are threaded into bores (unnumbered) of the element 301 (FIG. 15) to secure the heat-insulating members 312 to he presser bar 300. The heat-insulating members 312 are in turn suspended from bight portions 317 of the U-shaped brackets 313 received in selected ones of the channels 316, and legs 318, 320 of the brackets 313 are secured by identical nuts and bolts 321 to the support bar 310. The latter arrangement permits limited sliding movement of the presser bar 300, as indicated by the unnumbered oppositely headed arrows in FIG. 15. The support bar 310 is, of course, mounted for reciprocal sliding movement in the channel members 18, 20, and is connected to the piston-cylinder mechanisms 75, 76 (FIG. 1) by the brackets 77.

The support bar 310 carries a pair of identical means 325 between which is releasably clampingly secured a fabric sheet $S_4$, such as a garment waistband, and are operative to move the fabric $S_4$ from the phantom outline position of FIG. 12 to the solid line position in this same figure. In the phantom outline position clamping members 330 of the clamping mechanisms 325 are spaced an appreciable distance in front of and slightly below the heated presser bar 300 and the fabric $S_4$ can be secured to the clamping member 330 with little concern for an operator's hand touching and being burned by the presser bar. In the solid outline position of FIG. 12, the fabric $S_4$ is positioned with a longitudinal edge portion $E_4$ thereof positioned beneath the knurled surface of the presser bar 300 incident to the downward movement of the presser bar 300 and a subsequent bonding operation.

As is best illustrated in FIGS. 12 and 13, the clamping mechanism 325 is suspended from a guide rail 326 fixed to the rear of the support bar 310. A vertical flange 327 of a bracket 328 threadably receives a pair of screws 331 passed through bores (unnumbered) of a bracket 332. A reinforcing rib 333 is secured between the flange 327 and a horizontal base 334 having a downwardly directed flange 335 to which is secured a switch 336 actuated by a button 337. The other unillustrated clamping mechanism likewise includes an identically mounted switch 338 (FIG. 17). A fluid cylinder mechanism 340, 341, (FIGS. 12 and 17) is secured to the flanges 335 and piston rods 342 thereof each carries a stepped plate 343 having a vertical portion 344 fixed to an end of the piston rod 342 by a nut 345. An inverted U-shaped bracket 346 is fixed to the underside of the bracket base 334 and guidingly receives the vertical portion 344 of the stepped plate 343 to at all times maintain an end 349 of the stepped plate 343 is a horizontal plane. A trigger 347 is carried by the stepped plate 343 for actuating the button 337 of each of the switches 336, 338.

A generally L-shaped plate 348 is fixed to the end 349 of the stepped plate 343, and a leg 350 thereof is bent down to form a fabric guide or locating flange 351 whose forwardmost surface (unnumbered) is flush with a surface 352 of a block 353 secured to the underside of the plate 348. The clamping member 330 is pivotally carried by the block 353 by means of a shaft 354 passed through a bore 355 and retained in position by a collar 356. One end of a torsion spring 357 is secured to the block 353 by a screw 358 while an opposite turned end (unnumbered) overlies an end (unnumbered) of the clamping member 330 to biasingly urge an opposite end 359 toward the underside of the plate 348 and thereby clamp the fabric $S_4$ as best shown in FIG. 16.

Reference is now made to FIG. 17 of the drawings which illustrates a fluid control system 360 which includes portions structurally and functionally identical to the fluid control system 190 and are therefor identically numbered. For the purpose of describing the operation of the clamping mechanisms 325, it will be assumed that the upper presser bar 300 is in its uppermost position and that the piston rods 342 are in their outermost positions, as illustrated in phantom outline in FIG. 12. The fabric sheet $S_4$ is secured to the upper presser bar 300 by an operator first manually pivoting one of the clamping members 330 against the bias of the torsion spring 357, inserting the fabric sheet $S_4$ beneath the plate 348 with the edge in contact with the flange 351, and thereafter releasing the clamping member 330. The opposite end of the fabric sheet is likewise secured to the other of the clamping mechanisms.

The operator thereafter depresses the starter switch arm 188 of the switch 187 (FIG. 17) whereupon high-pressure fluid is conducted upwardly from the line 194 through the line 201 and the switch 187 to a line 361 to shift the control element 262 of the valve 199 from the port 264 to a port 362 allowing air to flow from the line 193 through the valve 199 and a line 363 into the cylinders 340, 341 of the clamping mechanism 325 causing the piston rods to be retracted. It is to be understood that the port 264 of the valve 199 is at the same time connected to an exhaust port so that air in the line 265 can be vented to the atmosphere and is not entrapped in the line 265 which would impede the operation of the apparatus. As a result of the retraction of the piston rods 342, the trigger 347 carried by the stepped plate 343 actuates each of the buttons 337 of the switches 336, 338 which are in a line 364 connected at one end to the line 363 and at an opposite end being joined to three lines 365 through 367 having respective activating impulse valves 370 through 372. Since the switches 336, 338 are arranged in series in the line 364, both switches must be actuated before high-pressure air will flow through the line 364 to the lines 365 through 367 and the valves 370 through 372 associated therewith.

The high-pressure air in the lines 364, 365 will cause the control element 205 of the valve 195 to close the port 203 to the air supply line 193 and open the port 206 to the supply line 193. This will deactivate the label clamp opening cylinder and activate the time delay 208 in the line 207 in the manner described relative to the apparatus 15 at which time the label clamp 120 will close.

The valve 372 causes the control element 212 of the valve 196 to shift in a manner opening the port 214 and closing the port 213 to the supply line 193. This reverses the flow of the air to the cylinder mechanism 73 causing the retraction of the locating means 60 associated with the lower presser bar.

The impulse valve 371 causes the control element 216 of the valve 197 to be shifted closing the port 217 and cutting off the flow of air to the cylinder mechanisms 75, 76. The cylinder mechanisms 75, 76 then exhaust air from their cylinders through the line 220 and the exhaust port 221 of the valve 197, whereby the upper presser bar 300 is lowered as described in connection with the apparatus 15. From this point the operation of the system is identical to that heretofore described relative to FIG. 11 up until the time the presser bar 300 begins its return to its original elevated position during which travel the bracket 178 (FIG. 3) actuates the switch 185 causing its control element 268 (FIG. 17) to connect the lines 270, 271 and a line 380 with the supply line 194. The high-pressure fluid in the lines 271, 380 causes actuation of the impulse relay valves 273, 261, respectively, and thereby readjusts the primary valves 196, 199. The primary valve 196 is adjusted by the shifting of the control element 212 thereof from the part 214 back to the port 213 so that high-pressure fluid now conducted through the line 274 from the line 193 causes the extension of the piston rod 72 and the return of the locating means 60 adjacent the lower presser bar 31. The control element 262 of the valve 199 is likewise shifted from the port 362 to the port 264 so that the flow of high-pressure fluid to the cylinders 340, 341 of the clamping mechanisms is reversed such that high pressure is now conducted from the line 193 through the port 264 and the line 265 through the lines 112 into the cylinders 340, 341. This results in the extension of the piston rods 342 and the clamping members 330 are thereby again brought to the loading position forward of the upper presser bar 300, as shown in phantom outline in FIG. 12. The fabric sheet $S_4$ and the fabric sheet (not shown) now bonded thereto are carried by the clamping mechanisms which simply lifted the bonded fabrics as a whole upon the upward movement of the presser bar. The now-bonded sheets are removed from the clamping members 330 by the operator and another piece of fabric positioned therein for a subsequent bonding operation.

It should be noted that with the forward movement of the piston rods the trigger 347 of each of the switches 336, 338 releases the actuating buttons 337 so that the switches or valves 336, 338 are again closed. Since the line 364 is not under pressure during the release of the buttons 337, the relay impulse valves 370 through 372 are not affected in any way and the actuation of the switches 336, 338 serves merely to reset the system for a succeeding operating cycle.

In regard to the actuation of the safety switches 166, 167, there is no change in the effects caused by the operation of the safety switches 166 of FIGS. 11 and 17. However, the operation of the safety switch 167 of the control system of FIG. 17 does differ from that of FIG. 11. By a comparison of the latter two figures, it will be noted that the line 258 of FIG. 11 has been omitted and therefore there is no connection between the line 256 (FIG. 17) leading away from the switch 167 and the relay impulse valve 261. However, as heretofore described, an impulse will be created in the relay valve 261 to create the same effect when the bracket 178 reengages the button of the switch 185 upon the returning movement of the upper presser bar 300 to its elevated position.

While preferred forms and arrangement of parts have been shown in illustrating the invention, it is to be clearly understood that various changes details and arrangements of parts may be made without departing from the spirit and scope of the invention as defined in the appended claimed subject matter.

We claim:

1. Apparatus for bonding sheets of fabric or the like by utilizing heat-activatable adhesives comprising first means for supporting a first sheet, second means for supporting a second sheet at a predetermined position relative to and spaced from the first means and the sheet supported thereby, means for imparting relative movement between said first and second means to bring portions of said sheets into pressure contacting relationship, heating means for activating heat-activatable adhesive contiguous the contacting portions thereby heat and pressure bonding the sheets to each other along the contacting portions thereof, means for securing at least one of said sheets to one of said first and second means, and means for releasing said securing means prior to relative movement of said first and second means away from each other by said movement imparting means thereby preventing relative movement of said bonded sheet portions away from each other which might otherwise tend to delaminate said bonded portions means for adjusting the position of said securing means by movement of said securing means in a direction transverse to said relative movement of said first and second supporting means and along one of said first and second means for securing different sizes of said one sheet to said one of said first and second means.

2. The apparatus as defined in claim 1 including means for actuating said releasing means after a predetermined time period following the termination of the movement of said first and second means toward each other.

3. Apparatus for bonding sheets of fabric or the like by utilizing heat-activatable adhesives comprising first means for supporting a first sheet, second means for supporting a second sheet at a predetermined position relative to and spaced from the first means and the sheet supported thereby, means for imparting relative movement between said first and second means to bring portions of said sheets into pressure contacting relationship, heating means for activating heat-activatable adhesive contiguous the contacting portions thereby heat and pressure bonding the sheets to each other along the contacting portions thereof, means for bonding another sheet to one of said first and second sheets prior to relative movement of said first and second means away from each other by said movement imparting means whereby said three sheets are bonded teach other, and means for selectively adjusting the position of said means for bonding said another sheet by movement of said last-mentioned bonding means in a direction transverse to said relative movement of said first and second supporting means thus selectively varying the position at which said another sheet is bonded to said one sheet.

4. The apparatus as defined in claim 3 wherein said first and second means are a pair of pressure-applying members, and said last-mentioned bonding means includes a pressure-applying member cooperative with one of said pair of pressure-applying members for clamping therebetween said another and one sheets.

5. The apparatus as defined in claim 3 wherein said first and second means are a pair of pressure-applying members, said last-mentioned bonding means includes a pressure-applying member cooperative with one of said pair of pressure-applying members for clamping therebetween said another and one sheets, and means for heating the pressure-applying member of said bonding means.

6. The apparatus as defined in claim 3 wherein said first and second means are a pair of pressure-applying members, one of said pressure-applying members being stationary, and said last-mentioned bonding means including a pressure-applying member carried by and movable relative to said one movable pressure-applying member for clamping therebetween said another and one sheets.

7. The apparatus as defined in claim 3 wherein said movement imparting means occupy a first position at which activation thereof is incapable of relatively moving said first and second means toward each other, and means for moving said movement imparting means to a second position at which activation thereof is capable of relatively moving said first and second means toward each other.

8. Apparatus for bonding sheets of fabric or the like by utilizing heat-activatable adhesives comprising first means for supporting a first sheet, second means for supporting a second sheet at a predetermined position relative to and spaced from the first means and the sheet supported thereby, means for imparting relative movement between said first and second means to bring portions of said sheets into pressure-contacting relationship, heating means for activating heat-activatable adhesive contiguous the contacting portions thereby heat and pressure bonding the sheets to each other along the contacting portions thereof, and means for actuating said movement imparting means for urging said sheets into pressure contacting relationship only when said first and second means are positioned a definite predetermined distance from each other, said first and second means are a pair of pressure-applying members, one of said pressure-applying members being movable along a predetermined generally linear path and the other of said pressure-applying members being stationary, said movement imparting means including a terminal end adapted to apply a force to said movable pressure-applying member in a direction generally parallel to said path, said terminal end being disposed to one side of and at an angle to said path in a first position, and means for positioning said movement imparting means at a second position to disposed said terminal end in opposed relation to said movable pressure-applying member and parallel to said path whereby movement thereof is effective for imparting movement to said movable pressure-applying member toward said stationary pressure-applying member.

9. Apparatus for bonding sheets of fabric or the like by utilizing heat-activatable adhesives comprising first means for supporting a first sheet, second means for supporting a second sheet at a predetermined position relative to and spaced from the first means and the sheet supported thereby, means for imparting relative movement between said first and second means to bring portions of said sheets into pressure contacting relationship, heating means for activating heat-activatable adhesive contiguous the contacting portions thereby heat and pressure bonding the sheets to each other along the contacting portions thereof, and means for actuating said movement imparting means for urging said sheets into pressure contacting relationship only when said first and second means are positioned a definite predetermined distance from each other, said first and second means are a pair of pressure-applying members, one of said pressure-applying members being movable along a predetermined generally linear path and the other of said pressure-applying members being stationary, said movement imparting means including a terminal end adapted to apply a force to said movable pressure-applying member in a direction generally parallel to said path, said terminal end being disposed to one side of and at an angle to said path in a first position, means for positioning said movement imparting means at a second position to dispose said terminal end in opposed relation to said movable pressure-applying member and parallel to said path whereby movement thereof is effective for imparting movement to said movable pressure-applying member toward said stationary pressure-applying member, and means supporting said movement imparting means and the terminal end thereof for swinging movement between said first and second positions.

10. Apparatus for bonding sheets of fabric or the like by utilizing heat-activatable adhesives comprising first means for supporting a first sheet, second means for supporting a second sheet at a predetermined position relative to and spaced from the first means and the sheet supported thereby, means for imparting relative movement between said first and second means to bring portions of said sheets into pressure contacting relationship, heating means for activating heat-activatable adhesive contiguous the contacting portions thereby heat and pressure bonding the sheets to each other along the contacting portions thereof, and means for actuating said movement imparting means for urging said sheets into pressure contacting relationship only when said first and second means are positioned a definite predetermined distance from each other, said first and second means are a pair of pressure-applying members, one of said pressure-applying members being movable along a predetermined generally linear path and the other of said pressure-applying members being stationary, said movement imparting means including a terminal end adapted to apply a force to said movable pressure-applying member in a direction generally parallel to said path, said terminal end being disposed to one side of and at an angle to said path in a first position, means for positioning said movement imparting means at a second position to dispose said terminal end in opposed relation to said movable pressure-applying member and parallel to said path whereby movement thereof is effective for imparting movement to said movable pressure-applying member toward said stationary pressure-applying member, and additional means for imparting movement to said movable pressure-applying member prior to the movement of said first-mentioned movement imparting means to said second position.

11. Apparatus for bonding sheets of fabric or the like by utilizing heat-activatable adhesives comprising first means for supporting a first sheet, second means for supporting a second sheet at a predetermined position relative to and spaced from the first means and the sheet supported thereby, means for imparting relative movement between said first and second means to bring portions of said sheets into pressure-contacting relationship, heating means for activating heat-activatable adhesive contiguous the contacting portions thereby heat and pressure bonding the sheets to each other along the contacting portions thereof, and means for actuating said movement imparting means for urging said sheets into pressure contacting relationship only when said first and second means are positioned a definite predetermined distance from each other, said first and second means are a pair of relatively movable pressure-applying members movable from a first position in substantial spaced relationship to a second position of contiguous relationship, said movement imparting means including first means for moving said pressure-applying members from said first position toward said second position, said movement imparting means further including second means for forcefully urging said pressure-applying members toward said second position after said relative movement has been first initiated by said initiating means, and means responsive during the relative movement of said pressure-applying members under the influence of said initiating means for selectively activating or preventing the actuation of said urging means.

12. Apparatus for bonding sheets of fabric or the like by utilizing heat-activatable adhesives comprising first means for supporting a first sheet, second means for supporting a second sheet at a predetermined position relative to and spaced from the first means and the sheet supported thereby, means for imparting relative movement between said first and second means to bring portions of said sheets into pressure contacting relationship, heating means for activating heat-activatable adhesive contiguous the contacting portions thereby heat and pressure bonding the sheets to each other along the contacting portions thereof, and means for actuating said movement imparting means for urging said sheets into pressure contacting relationship only when said first and second means are positioned a definite predetermined distance from each other, said first and second means are a pair of relatively movable pressure-applying members movable from a first position in substantial spaced relationship to a second position of contiguous relationship, said movement imparting means including first means for moving said pressure-applying members from said first position toward said second position, said movement imparting means further including second means for forcefully urging said pressure-applying members toward said second position after said relative movement has been first initiated by said initiating means, means responsive during the relative movement of said pressure-applying members under the influence of said initiating means for selectively activating or preventing the actuation of said urging means, and said responsive means are responsive only upon the relative movement of said pressure-applying member to a relative position between said first and second positions.

13. Apparatus for bonding sheets of fabric or the like by utilizing heat-activatable adhesives comprising first means for supporting a first sheet, second means for supporting a second sheet at a predetermined position relative to and spaced from the first means and the sheet supported thereby, means for imparting relative movement between said first and second means to bring portions of said sheets into pressure contacting relationship, heating means for activating heat-activatable adhesive contiguous the contacting portions thereby heat and pressure bonding the sheets to each other along the contacting portions thereof, said movement imparting means occupying a first position at which activation thereof is incapable of relatively moving said first and second means toward each other, and means for moving said movement imparting means to a second position at which activation thereof is capable of relatively moving said first and second means toward each other.

14. Apparatus for bonding sheets of fabric or the like by utilizing heat-activatable adhesives comprising first means for supporting a first sheet, second means for supporting a second sheet at a predetermined position relative to and spaced from the first means and the sheet supported thereby, means for imparting relative movement between said first and second means to bring portions of said sheets into pressure contacting relationship, heating means for activating heat-activatable adhesive contiguous the contacting portions thereby heat and pressure bonding the sheets to each other along the contacting portions thereof, means for securing at least one of said sheets to one of said first and second means, and means for releasing said securing means prior to relative movement of said first and second means away from each other by said movement imparting means thereby preventing relative movement of said bonded sheet portions away from each other which might otherwise tend to delaminate said bonded portions, said movement imparting means occupy a first position at which activation thereof is incapable of relatively moving said first and second means toward each other, and means for moving said movement imparting means to a second position at which activation thereof is capable of relatively moving said first and second means toward each other.

15. A bonding mechanism comprising a presser bar having a surface in opposing relationship to a surface of a pressure-applying member carried by said presser bar, means for moving said member relative to said presser bar for placing portions of sheets disposed between said surfaces in pressure-contacting relationship, heating means for activating heat-activatable adhesive contiguous the sheets for bonding the sheets to each other, and means for selectively adjusting the position of said member along the length of said presser bar for selectively varying the position at which one of the sheets is bonded to the other of said sheets.

16. The bonding mechanism as defined in claim 15 wherein said member is of a generally L-shaped configuration, one leg of said L-shaped member being defined in part by the surfaces thereof, and another leg of said L-shaped member being coupled to said moving means.

* * * * *

PO-1050
(5/69)

UNITED STATES PATENT OFFICE
CERTIFICATE OF CORRECTION

Patent No. 3,635,780          Dated January 18, 1972

Inventor(s) RICHARD V. GRIGGS and JOHN G. ATTWOOD

It is certified that error appears in the above-identified patent and that said Letters Patent are hereby corrected as shown below:

Col. 5, line 10, read "72" as -- 73 --; line 15, read "50" as -- 60 --; line 17, read "74" as -- 73 --; line 38, read "releasable" as -- releasably --.

Col. 7, line 23, read "$S_3$" as -- $S_2$ --.

Col. 10, line 10, read "is" as -- its --; lines 26, 27 read "$S_1,S_2$" as -- $S_2S_3$ -- line 32, read "125" as -- 120 --.

Col. 12, line 46, read "he" as -- the --

Col. 13, line 36, read "he" as -- the --; line 38, read "head" as -- hand --; line 47, omit "the developed".

Col. 14, line 42, read "3:12" as -- 312 --.

Col. 16, line 20, read "part" as -- port -- .

Col. 19, lines 38 and 40, read "initiating means" as -- moving means --.

Col. 20, lines 2 and 4, read "initiating means" as -- moving means --.

In the drawings, Fig. 1, read reference numeral "27" at the left end of bonding machine as -- 24 --; also, read lead line from reference numeral "28" to indicate the hole in the flange of element 18 to the right of element 41. Fig. 4, read lead line from reference numeral 35 to indicate the bore in elements 33-34. Figure 6, read reference numeral 106 with its lead line ending on the bottom end of element 102. Fig. 7, read lead line from reference numeral 106 to indicate the bottom end of the element 102. Fig. 8, read lead line from reference numeral 134 to contact the next most adjacent short vertical edge. Fig. 9 read lead line from reference numeral 134 to indicate the element carried at the left notched corner of element 135. Fig. 11, read "151" as -- 152 --. Fig. 12, read reference numeral 359 as being located at the top of the same element; read "78" as -- 77 --. Figs. 13 and 14, read "345" as --364--. Fig. 15, read "78" as -- 77 --. Fig. 16, read "345" as --364-- and "334" as -- 344 --. Fig. 17, read "257" as -- 365 --.

In the abstract page, read "Halt" as -- Holt --.

Signed and sealed this 15th day of May 1973.

(SEAL)
Attest:

EDWARD M. FLETCHER, JR.          ROBERT GOTTSCHALK
Attesting Officer          Commissioner of Patents

UNITED STATES PATENT OFFICE
CERTIFICATE OF CORRECTION

Patent No. 3,635,780                    Dated January 18, 1972

Inventor(s) RICHARD V. GRIGGS and JOHN G. ATTWOOD

It is certified that error appears in the above-identified patent and that said Letters Patent are hereby corrected as shown below:

Col. 18, line 19, read "disposed" as -- dispose --

Signed and sealed this 20th day of November 1973.

(SEAL)
Attest:

EDWARD M. FLETCHER, JR.  
Attesting Officer

RENE D. TEGTMEYER  
Acting Commissioner of Patents